United States Patent
Kim et al.

(10) Patent No.: US 10,547,731 B2
(45) Date of Patent: Jan. 28, 2020

(54) METHOD FOR MANAGING AND CONTROLLING EXTERNAL IOT DEVICE AND ELECTRONIC DEVICE SUPPORTING THE SAME

(71) Applicant: Samsung Electronics Co., Ltd., Gyeonggi-do (KR)

(72) Inventors: Nam Jin Kim, Gyeonggi-do (KR); Tae Jun Kim, Gyeonggi-do (KR); Hae Na Kim, Gyeonggi-do (KR); Yoe Chan Song, Gyeonggi-do (KR); Jung Hwan Song, Gyeonggi-do (KR); Sung Yeon Woo, Gyeonggi-do (KR); Joon Hwan Lee, Seoul (KR); Pyo Je Cho, Gyeonggi-do (KR); Han Jib Kim, Gyeonggi-do (KR); Gyu Cheol Choi, Gyeonggi-do (KR); Bo Kun Choi, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/935,472

(22) Filed: Mar. 26, 2018

(65) Prior Publication Data

US 2018/0288209 A1    Oct. 4, 2018

(30) Foreign Application Priority Data

Mar. 29, 2017  (KR) .................. 10-2017-0039912

(51) Int. Cl.
*H04M 1/725* (2006.01)
*H04L 12/24* (2006.01)
(Continued)

(52) U.S. Cl.
CPC ........ *H04M 1/72533* (2013.01); *H04L 41/22* (2013.01); *H04L 67/12* (2013.01);
(Continued)

(58) Field of Classification Search
CPC ... H04M 1/72533; H04W 4/80; H04W 76/10; H04W 4/14; H04L 41/22; H04L 67/12; H04L 67/26
See application file for complete search history.

(56) References Cited

U.S. PATENT DOCUMENTS

| 9,473,504 B2 | 10/2016 | Sundaresan et al. |
| 2014/0006517 A1* | 1/2014 | Hsiao .................. G06Q 50/01 709/205 |

(Continued)

OTHER PUBLICATIONS

Tschofenig et al.; "Authentication and Authorization for Constrained Environments Using OAuth and UMA"; Internet Engineering Task Force; Mar. 9, 2015; p. 1-22; XP015105482.
(Continued)

*Primary Examiner* — Kathy W Wang-Hurst
*Assistant Examiner* — Ernest G Tacsik
(74) *Attorney, Agent, or Firm* — Cha & Reiter, LLC

(57) ABSTRACT

A method and electronic device are disclosed herein. The electronic device includes a display, a communication unit, a processor and a memory storing instructions. The process executes the instructions to implement the method, including establishing wireless communication with one or more IoT devices, displaying a user interface for managing IoT devices, receiving a user input selecting a group of IoT devices, transmitting first information including user account data to an external server, transmitting second information to another device, the first information also indicating a selected group of IoT devices, and the second information causing the other device to communicatively connect with the first external server.

10 Claims, 20 Drawing Sheets

(51) Int. Cl.
  *H04L 29/08*   (2006.01)
  *H04W 76/10*   (2018.01)
  *H04W 4/80*    (2018.01)
  *H04W 4/14*    (2009.01)

(52) U.S. Cl.
  CPC .............. *H04L 67/26* (2013.01); *H04W 4/14* (2013.01); *H04W 4/80* (2018.02); *H04W 76/10* (2018.02)

(56) References Cited

U.S. PATENT DOCUMENTS

| | | | |
|---|---|---|---|
| 2015/0237071 A1* | 8/2015 | Maher | H04L 63/20 726/1 |
| 2016/0036764 A1* | 2/2016 | Dong | H04L 61/3025 370/254 |
| 2016/0112429 A1 | 4/2016 | Sundaresan et al. | |
| 2016/0112433 A1 | 4/2016 | Chung et al. | |
| 2016/0112434 A1 | 4/2016 | Chung et al. | |
| 2016/0212178 A1* | 7/2016 | Zhang | H04L 65/1066 |
| 2017/0126525 A1* | 5/2017 | Coates | H04L 43/0817 |
| 2017/0366966 A1* | 12/2017 | Carter | G06F 21/6245 |
| 2018/0019929 A1* | 1/2018 | Chen | H04L 41/145 |
| 2018/0098366 A1* | 4/2018 | Cohn | H04W 76/14 |

OTHER PUBLICATIONS

Cirani et al; "Effective Authorization for the Web of Things"; 2015 IEEE 2nd World Forum on Internet of Things; Dec. 14, 2015; p. 316-320; XP032854079.
European Search Report dated Aug. 3, 2018.

* cited by examiner

METHOD FOR MANAGING AND CONTROLLING EXTERNAL IOT DEVICE AND ELECTRONIC DEVICE SUPPORTING THE SAME

CROSS-REFERENCE TO RELATED APPLICATION(S)

This application is based on and claims priority under 35 U.S.C. § 119 to Korean Patent Application No. 10-2017-0039912, filed on Mar. 29, 2017, in the Korean Intellectual Property Office, the disclosure of which is incorporated by reference herein its entirety.

TECHNICAL FIELD

Various embodiments of the present disclosure relate to a method for managing and controlling an external Internet-of-Things (IoT) device and an electronic device supporting the same.

BACKGROUND

Internet of Things (hereinafter, referred to as IoT) technology has been developed. Various types of things may include a wireless communication module and may transmit and receive data with another device in real time through the communication module. For example, various IoT devices may be present in a house. TV, an air conditioner, an air cleaner, a vacuum cleaner, a light, or the like to which IoT technology is applied may be present in a living room, and a refrigerator, an oven, a light, or the like to which IoT technology is applied may be present in a kitchen.

The IoT devices may transmit and receive data by using wireless communication technologies, such as ZigBee®, Z-Wave®, BT/BLE®, Wi-Fi®, a cellular network (e.g., 3G or LTE), or the like. Each of the wireless communication technologies may have various characteristics in configuring a usable frequency, a data rate, a transmission distance, power consumption, and network topology.

An electronic device (e.g., a smartphone) that integrally manages the IoT devices may establish communication with IoT devices within a specified range and may store information beneficial for control. For example, the electronic device may execute an application for managing IoT devices. The application may output a UI capable of registering or removing a new IoT device.

The above information is presented as background information only to assist with an understanding of the present disclosure. No determination has been made, and no assertion is made, as to whether any of the above might be applicable as prior art with regard to the present disclosure.

SUMMARY

In the related art, IoT devices existing in various spaces (e.g., a living room or a room in a house, an office, or the like) may be operated through operating devices (e.g., remote controllers) in conjunction with the respective spaces.

Alternatively, the IoT devices may be operated by an electronic device (e.g., a smartphone) in which applications operating in conjunction with the IoT devices are installed. In this case, another electronic device in which an application capable of managing and controlling an IoT device is not installed has to repeatedly install applications, search for a plurality of IoT devices, and establish connections to manage and control the plurality of IoT devices.

Aspects of the present disclosure are to address at least the above-mentioned problems and/or disadvantages and to provide at least the advantages described below. Accordingly, an aspect of the present disclosure is to provide a method in which an electronic device managing a plurality of IoT devices shares setting information for managing the plurality of IoT devices with an external device, and an electronic device that supports the same.

In accordance with an aspect of the present disclosure, an electronic device includes a display, a wireless communication circuit, a processor, and a memory. The memory includes instructions executable by the processor to establish wireless communication with one or more IoT devices by using the wireless communication circuit, display a user interface for managing a plurality of including the one or more IoT devices through the display, receive a user input selecting a group of IoT devices from among the one or more IoT devices, transmit first information including user account data of the electronic device to a first external server using the wireless communication circuit, transmit second information to another electronic device using the wireless communication circuit, wherein the first information includes information indicating the selected group and the user account data of the electronic device, and wherein the second information causes the other electronic device to communicatively connect with the first external server and control one or more IoT devices included in the selected group.

In an aspect of the present disclosure, an electronic device is disclosed including a display, a wireless communication circuit, a processor and a memory. the memory stores instructions executable by the processor to: receive at least one of a push message through a first application for managing one or more Internet-of-Things (IoT) devices from a first external server and an SMS message related to the first application from a second external server, and when the first application is executed, receive, from the first external server, setting information for controlling the one or more IoT devices by another electronic device.

In an aspect of the present disclosure, an electronic device is disclosed including a display, a communication circuit, a memory and a processor. The processor establishes wireless communication with one or more Internet-of-Things (IoT) devices using the communication circuit, transmits setting information associated with the one or more IoT devices to an external server using the communication circuit, and transmits a request signal including first user account information and second user account information to the external server, wherein at least a portion of the transmitted setting information is included in the transmitted request signal and is further transmitted to another electronic device, wherein the first user account information indicates at least a first user registered to the electronic device, and wherein the second user account information indicates at least a second user registered to the other electronic device.

A device management method and an electronic device supporting the same, according to various embodiments of the present disclosure, may share setting information related to an IoT device with an external electronic device.

A device management method and an electronic device supporting the same, according to various embodiments of the present disclosure, may transmit an invitation message to an external electronic device by using a user account or a telephone number of an application that manages an IoT device.

A device management method and an electronic device supporting the same, according to various embodiments of the present disclosure, may safely share information and authority relating to control of an IoT device with an external electronic device through an authentication process.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
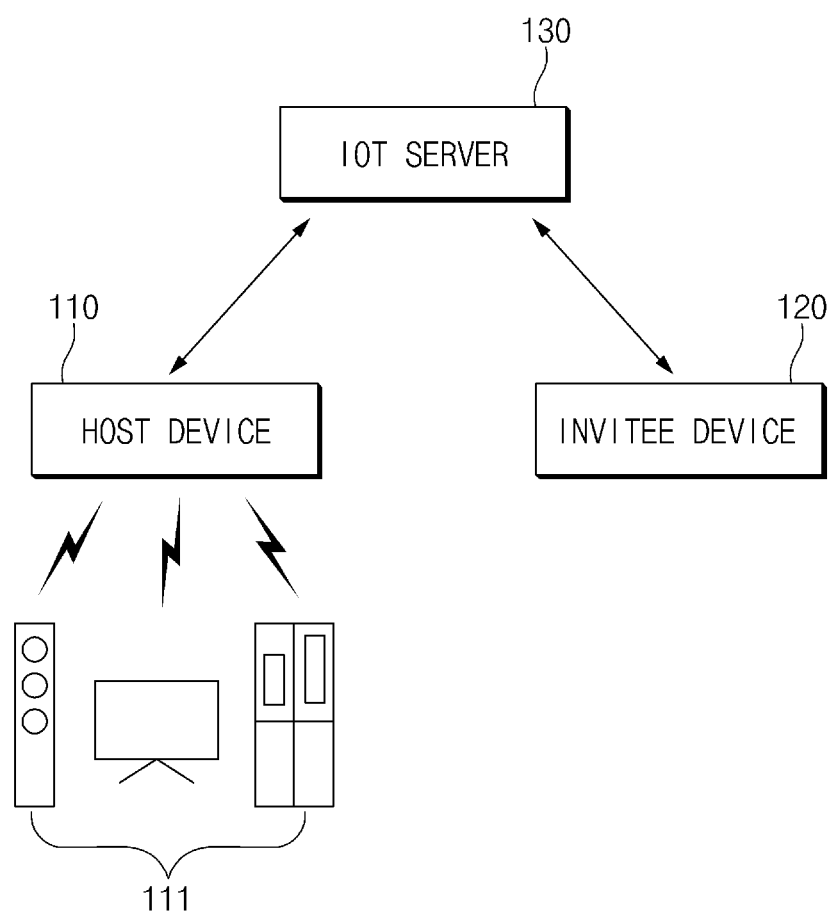
FIG. 1A and FIG. 1B illustrate an IoT device management system according to various embodiments.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital video disk (DVD) player, an audio, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™ or Play Station™), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

Figure 1B:
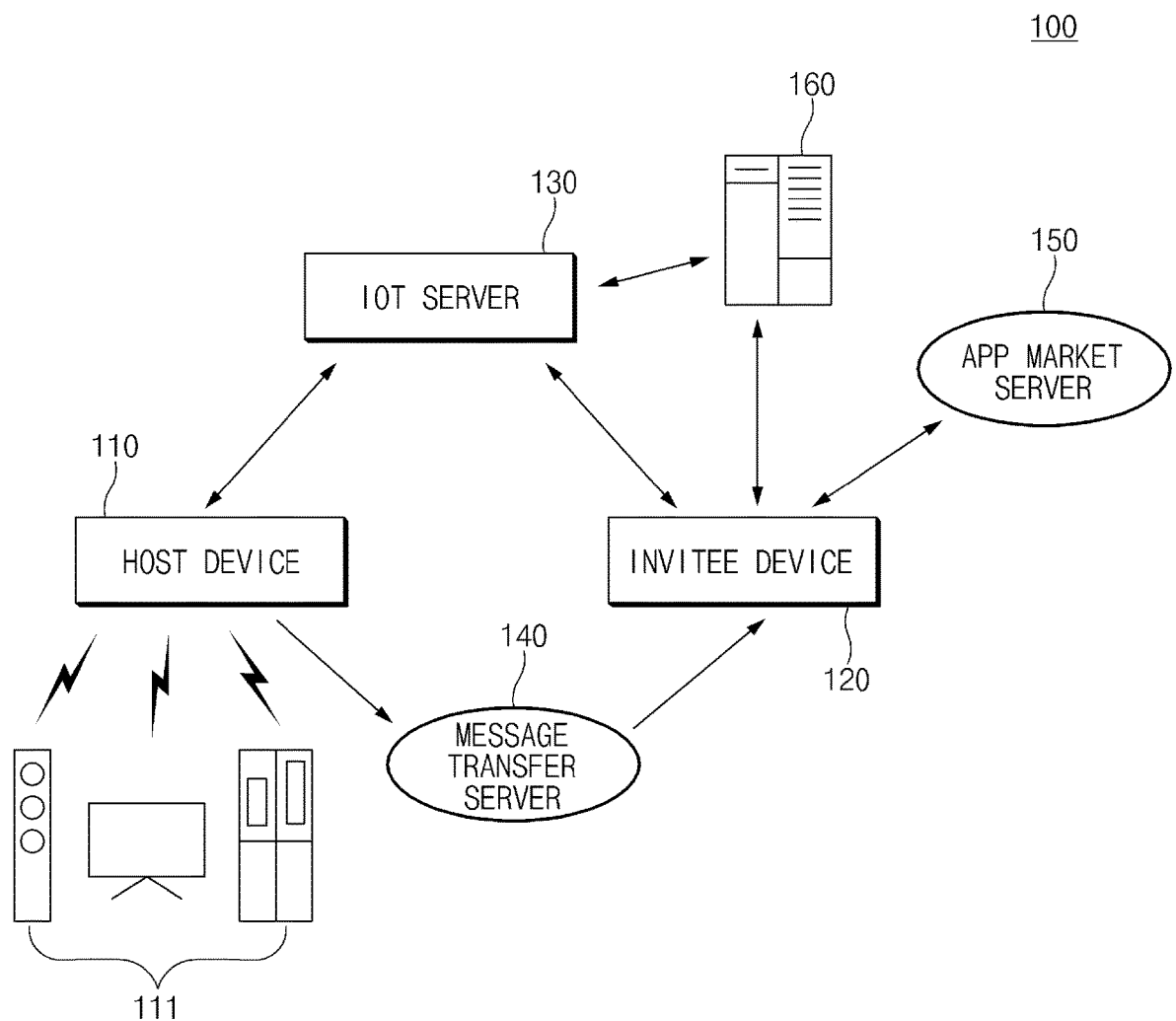

FIGS. 1A and 1B illustrate an IoT device management system according to various embodiments.

Referring to FIGS. 1A and 1B, an IoT device management system 100 may include a first electronic device or host device 110, a second electronic device 120, and an IoT server 130. According to various embodiments, the IoT device management system 100 may further include a message transfer server (e.g., an SMS server) 140, an application market server 150, and an authentication server 160.

The first electronic device or host device 110 (hereinafter, referred to as the 'host device') (e.g., a smartphone or a tablet PC) may manage various IoT devices 111. For example, the host device 110 may discover the IoT devices 111 around the host device 110 and may establish communication with each of the IoT devices 111. The host device 110 may display, on a display thereof, the IoT devices 111 that are controllable.

The host device 110 may execute an application (hereinafter, referred to as the IoT management app) that manages IoT devices. The IoT management app may check a communication status of each IoT device 111 and may output a user interface for control of the IoT device 111. In an embodiment, the IoT management app may be downloaded through the application market server 150 (e.g., Google Play Store or Apple App Store) and may be installed in the host device 110 or the second electronic device or the invitee device 120 (hereinafter, referred to as the 'invitee device') (e.g., a smartphone or a table PC).

According to various embodiments, the host device 110 may manage the various IoT devices 111 located in a plurality of places, by using the IoT management app. For example, the host device 110 may collectively manage a first group of IoT devices (e.g., TV 1, refrigerator 1, or air-conditioner 1) located in a first area (e.g., a user's home) and a second group of IoT devices (e.g., TV 2, air-conditioner 2, or air-cleaner 1) located in a second area (e.g., the user's office).

The IoT management app may manage the first group of IoT devices and the second group of IoT devices as separate things. For example, in the case where the user selects (e.g., through a touch input or a voice input) a place (e.g., a tab for managing the place) that corresponds to a first location (e.g., the user's home), the host device 110 may display a list, status information, or controllable functions of the first group of IoT devices (e.g., TV 1, refrigerator 1, and air-conditioner 1). In the case where the user selects a place corresponding to a second location (e.g., the user's office), the host device 110 may display a list, status information, or controllable functions of the second group of IoT devices (e.g., TV 2, air-conditioner 2, and air-cleaner 1). Alternatively, in the case where the user selects a tab corresponding to a full list, the host device 110 may display a list, status information, or functions of all the IoT devices included in the first and second groups.

The host device 110 may store setting information or control information (hereinafter, referred to as IoT environment information) about the plurality of IoT devices 111. For example, the IoT environment information may include identification information, device types, executable-function information, authority information, or control methods of the IoT devices 111.

According to various embodiments, the host device 110 (used with an account of a first user) may share the stored IoT environment information with the invitee device 120 (used with an account of a second user). For example, the host device 110 (e.g., a smartphone) of the first user (e.g., father) may provide IoT environment information about TV 1, refrigerator 1, and air-conditioner 1 located in the home to the invitee device 120 (e.g., a smartphone) of the second user (e.g., spouse or child). In the case where the IoT environment information is shared according to a specified procedure, the invitee device 120 may have control authority over TV 1, refrigerator 1, and air-conditioner 1.

According to various embodiments, the shared IoT environment information may be all or part of the IoT environment information stored in the host device 110. For example, information about all places (e.g., Home, Office, and Nearby), some places (Home), or some devices (e.g., TV or an air-conditioner registered in home) registered in the IoT environment information of the host device 110 may be shared with the invitee device 120.

According to various embodiments, the host device 110 may start a process of sharing the IoT environment information, by transmitting an invitation message (or a message for sharing) to the invitee device 120. The invitation message may include information about the host device 110, information about controllable IoT devices, information about the IoT management app, or information about places (or locations) where the IoT devices are located.

According to various embodiments, the host device 110 (registered by the first user's account) may transmit the invitation message, based on the account information or the telephone number of the second user of the invitee device 120 (registered by the second user's account). For example, in the case where an IoT management app is installed in the invitee device 120 and the invitee device 120 is logged in using the second user's account, the host device 110 may transmit the invitation message through the IoT server 130 by a push message method. In another example, in the case where an IoT management app is not installed in the invitee device 120, the host device 110 may transmit an SMS message including a URL for installation of an IoT management app as the invitation message.

According to various embodiments, the host device 110 may create an invitation message, based on IoT device information, the first user's account registered in the host device 110, and information about the invitee device 120. For example, the host device 110 or the IoT server 130 may create a hash code of the invitation message. In another example, the host device 110 may create an invitation message, based on information (name and spatial information) of the host device 110 and a URL for downloading an IoT management app. Additional information about a method of transmitting the invitation message by the host device 110 may be provided through FIGS. 2, 3A, and 3B.

The invitee device 120 may receive an invitation message from the host device 110 or the IoT server 130. In an embodiment, the invitation message may be a message that is transmitted through a push message or a text message (e.g., SMS or MMS) of an IoT management app or short-range communication (e.g., NFC or BLE).

The invitee device 120 may receive the IoT environment information stored in the host device 110, by using the invitation message. In this case, the invitee device 120 may obtain control authority over at least one IoT device managed by the host device 110. The invitee device 120 may operate as a separate host device that is distinguished from the host device 110. Additional information about a process of receiving the IoT environment information by the invitee device 120 may be provided through FIG. 6.

The IoT server 130 may include a memory, a communication circuit, or a processor therein and may serve as an intermediary between the host device 110 and the invitee device 120 in a process of sharing the IoT environment information. The IoT server 130 may receive, from the host device 110, information (hereinafter, referred to as sharing setting information) useful for sharing the IoT environment information. The sharing setting information may include first user account information, place information (or group information of IoT devices), IoT device information, or information about the invitee device 120 (account information or a phone number of the second user).

The IoT server 130 may create a push message to be transmitted to the invitee device 120. The IoT server 130 may create a push message list, based on the sharing setting information.

In an embodiment, the IoT server 130 may transmit the push message in the case where an IoT management app is installed in the invitee device 120 and the invitee device 120 is logged in using the second user's account. In another embodiment, in the case where the invitee device 120 is not logged in to an IoT management app by using the second user's account, the IoT server 130 may transmit accumulated push messages to the invitee device 120 when the invitee device 120 logs in to the IoT management app by using the second user's account. In another embodiment, in the case where an IoT management app is not installed in the invitee device 120, the IoT server 130 may transmit, to the invitee device 120, a list of accumulated push messages based on the identification information (e.g., the telephone number) of the invitee device 120 when the invitee device 120 installs an IoT management app, creates an account of the second user, and performs SMS authentication related to the account of the second user.

According to various embodiments, the IoT server 130 may remove the information (e.g., the telephone number) of the invitee device 120 when settings for sharing the IoT environment information are completed.

The message transfer server 140 may play an intermediary role in the transfer of a message between the host device 110 and the invitee device 120. For example, the message transfer server 140 may serve as an intermediary to allow the host device 110 and the invitee device 120 to transmit and receive a message in an SMS or MMS form.

The application market server 150 may be a server capable of downloading various applications. The application market server 150 may provide an installation file for installing an IoT management app, in response to a request of the invitee device 120.

The authentication server 160 may perform authentication on a telephone number in response to a request of the invitee device 120. In various embodiments, in the case where the host device 110 transmits an invitation message through the telephone number of the invitee device 120, authentication of a subject requesting the invitation message from the IoT server 130 may be utilized to enhance security. In this case, the invitee device 120 may request the authentication server 160 to perform an authentication procedure on the telephone number of the invitee device 120. The authentication server 160 may transmit the authentication result to the IoT server 130 and the invitee device 120.

Figure 2:
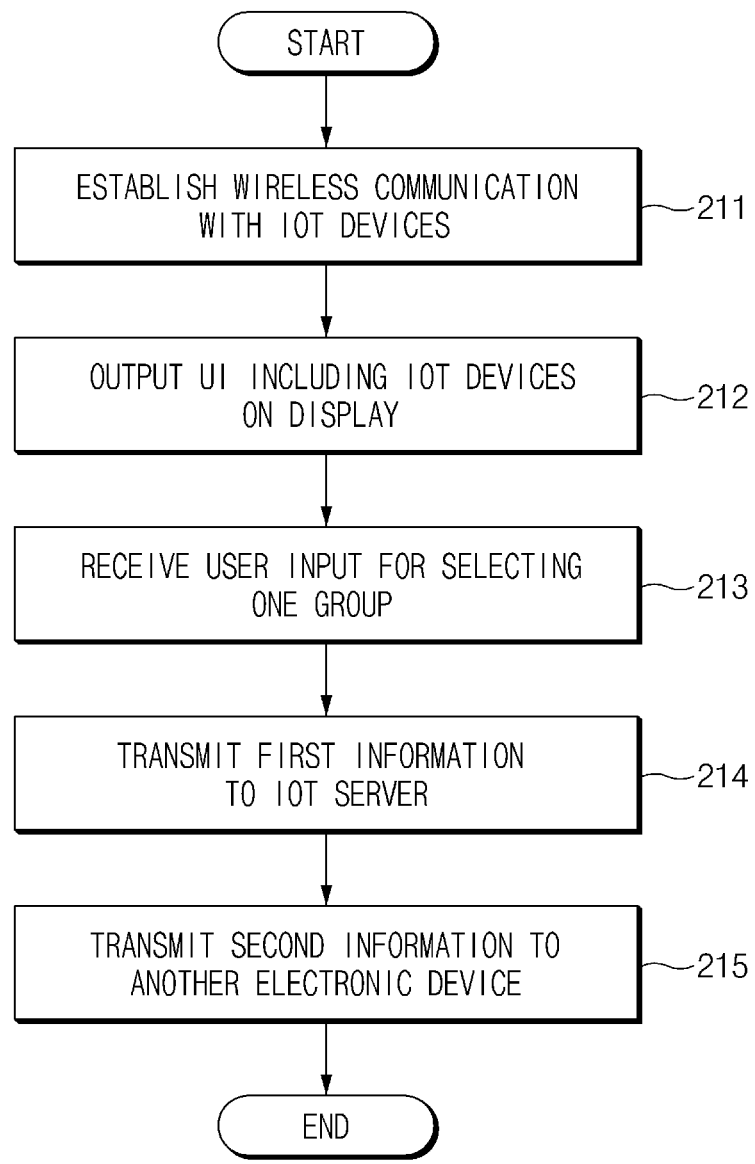
FIG. 2 is a flowchart illustrating a device management method according to various embodiments.

FIG. 2 is a flowchart illustrating a device management method according to various embodiments.

Referring to FIG. 2, in operation 211, the host device 110 may establish wireless communication with one or more IoT devices using a communication circuit. For example, the host device 110 may establish communication channels with IoT devices around the host device 110 using short-range communication, Wi-Fi communication (e.g., communication belonging to the same AP), and/or cellular communication. The host device 110 may receive information useful for controlling the IoT devices (e.g., identification information or device types of the IoT devices, or information about controllable functions) from the IoT devices, or the IoT server 130 through the communication channels. According to various embodiments, the host device 110 may establish the communication channels with the one or more IoT devices through separate authentication processes (e.g., such as input of a password, an identification number, or input of some biometric information).

In operation 212, the host device 110 may output, through a display, a user interface including a list of the one or more IoT devices. The host device 110 may execute an IoT management app to display a list of IoT devices that are capable of communication and/or otherwise controllable. According to various embodiments, the host device 110 may manage the one or more IoT devices by dividing the IoT devices into groups. For example, the host device 110 may group the plurality of IoT devices according to location (e.g., such as home, office, living room, room 1, room 2, etc.) indicating where the plurality of IoT devices are physically located within a locale, access points (APs) to which the plurality of IoT devices are connected, and/or any other criteria created or configured by a user.

In operation 213, the host device 110 may receive, from a first user, a user input for selecting a group of IoT devices from among the one or more IoT devices. For example, as described above, the group may be classified according to the location where the IoT devices are located. The user input may therefore include an input selecting a tab corresponding to the particular group and adding another user in the IoT management app. For example, in the case where the user selects a "living-room" tab from among tabs including "living-room," "room 1," and "room 2" and further selects an "add member" button, processes executable to share IoT environment information may be initiated.

In operation 214, the host device 110 may transmit first information including user account data of the first user to the IoT server 130 (the first external server) using the communication circuit. The first information may also include information about the selected group, and the account of the first user associated with the host device 110. For example, the first information may include at least one or more of first user account information, place information (or group information of IoT devices), IoT device information, and information about the invitee device 120 (i.e., referring to for example second user account information or a phone number associated with the invitee).

In operation 215, the host device 110 may transmit the second information to another electronic device (e.g., referring to the invitee device 120) using the communication circuit. The second information may be information which facilitates the other electronic device to communicatively respond to the IoT server 130 to connect to and thus control the selected group. For example, the second information may include URL information for installing an IoT management app.

According to an embodiment, the second information may be delivered to the other electronic device through the IoT server 130, or may be transmitted to the other electronic device through the separate message transfer server 160. According to another embodiment, the host device 110 may transmit the second information to the other electronic device (e.g., the invitee device 120) through short-range communication (e.g., Bluetooth).

Figure 3A:
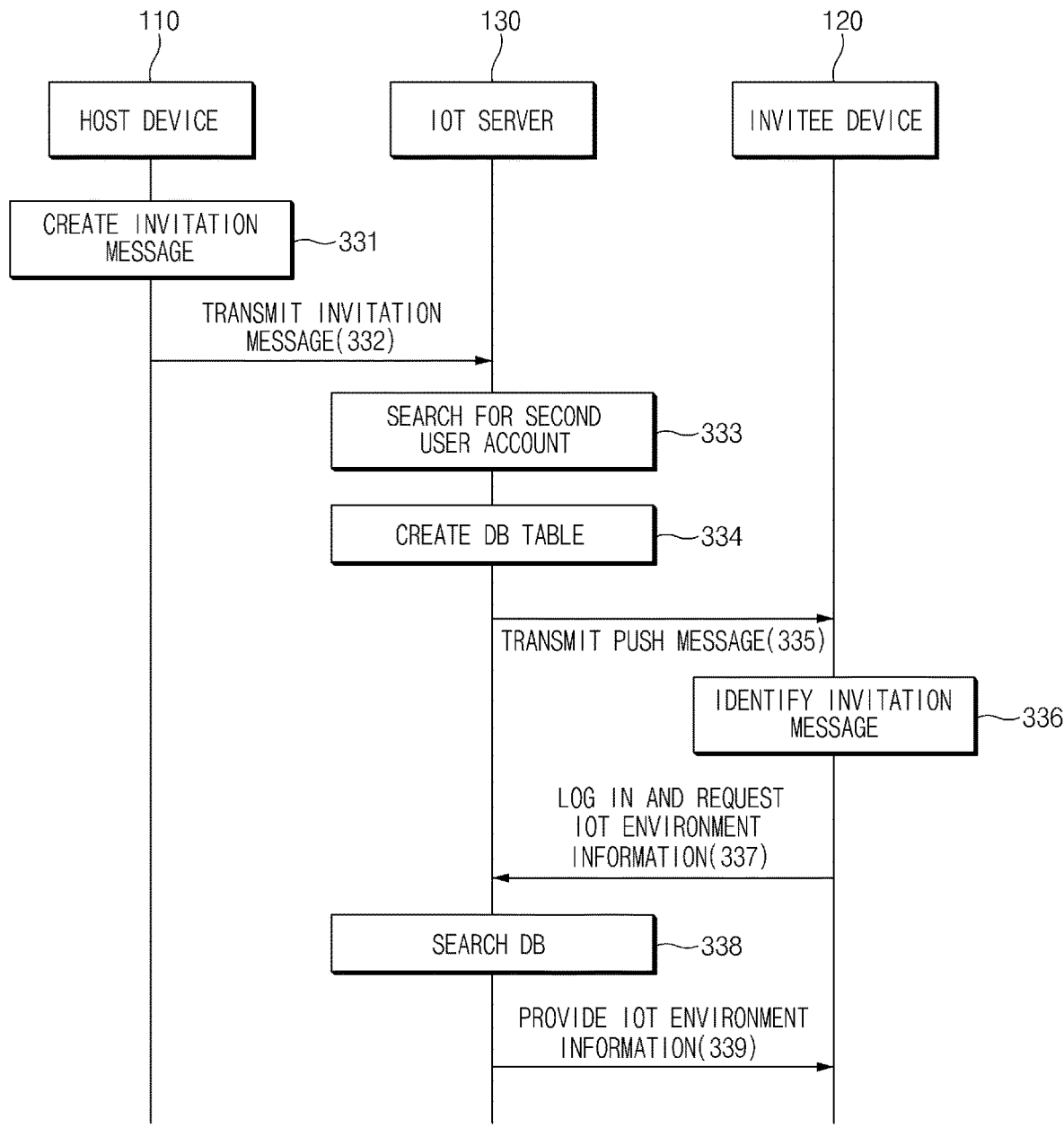
FIG. 3A is a signal flow diagram illustrating a process of sharing IoT environment information using an account of a second user, according to various embodiments.

FIG. 3A is a signal flow diagram illustrating a process of sharing IoT environment information using an account of a second user, according to various embodiments.

Referring to FIG. 3A, in operation 331, the host device 110 may create an invitation message (or a request signal) by receiving IoT environment information to be shared (e.g., a list of IoT devices or the location of the IoT devices) and the account of the second user of the invitee device 120 from a user through an IoT management app. For example, the second user's account information may be directly input by the user, or may be input through information of a contact stored in the host device 110.

In operation 332, the host device 110 may transmit the created invitation message to the IoT server 130. For example, the invitation message may include first user account information, place information (or group information of IoT devices), IoT device information, or second user account information.

In operation 333, the IoT server 130 may search a database for the second user's account that was indicated or otherwise included in the invitation message. For example, in the case where an IoT management app is installed in the invitee device 120 a log-in history of the second user exists, the second user's account may be discoverable in the database of the IoT server 130. According to an embodiment, in the case where the second user's account is not discovered in the database of the IoT server 130, the IoT server 130 may determine that the second user's account included in the invitation message is invalid, and may transmit an error message to the host device 110. The host device 110, when receiving the error message from the IoT server 130, may display a notification (e.g., a pop-up message) to the user, or may provide a user interface of guide screen to prompt the user to reenter the second user's account.

In the case where the second user's account is discovered in the database of the IoT server 130, the IoT server 130 may, in operation 334, create a database table based on the received invitation message. For example, the IoT server 130 may create a database table that includes first user account information, second user account information, authority information, creation time information, or update time information.

In operation 335, the IoT server 130 may inform the invitee device 120 corresponding to the second user that the invitation message has arrived, by using a push message.

According to an embodiment, the IoT server 130 may transmit the push message in real time when the invitee device 120 is logged in to the IoT management app by using the discovered account of the second user, or when the invitee device 120 allows the receipt of a push message. According to another embodiment, in the case where the invitee device 120 is not logged in to the IoT management app by using the discovered account of the second user or does not allow the receipt of a push message, the IoT server 130 may transmit the push message after the invitee device 120 logs in to the IoT management app by using the second user's account. According to another embodiment, in the case where an IoT management app is not installed in the invitee device 120, the IoT server 130 may transmit the push message after an IoT management app is installed in the invitee device 120 and the invitee device 120 logs in to the IoT management app by using the second user's account.

In operation 336, the invitee device 120 may identify the invitation message. In the case where the invitee device 120 is logged in to the IoT management app using the second user account, the invitee device 120 may inform the second user of the reception or arrival of the invitation message in real time. In the case where the invitee device 120 is not logged in to the IoT management app by using the second user account, the invitee device 120 may inform the second user of the arrival of the invitation message after logging in to the IoT management app.

According to various embodiments, the invitee device 120 may automatically execute the IoT management app when the second user identifies the invitation message.

In operation 337, the invitee device 120 may log in to the IoT management app using the second user account, and may request the IoT environment information from the IoT server 130.

According to various embodiments, the invitee device 120 may automatically log in using the second user account according to settings of the installed IoT management app and may request the IoT server 130 to provide the IoT environment information.

In operation 338, the IoT server 130 may identify the second user's account and the invitation message in the database table.

In operation 339, the IoT server 130 may transmit the IoT environment information to the invitee device 120. When the invitee device 120 receives the IoT environment information, the invitee device 120 may control at least some of the IoT devices managed by the host device 110.

Figure 3B:
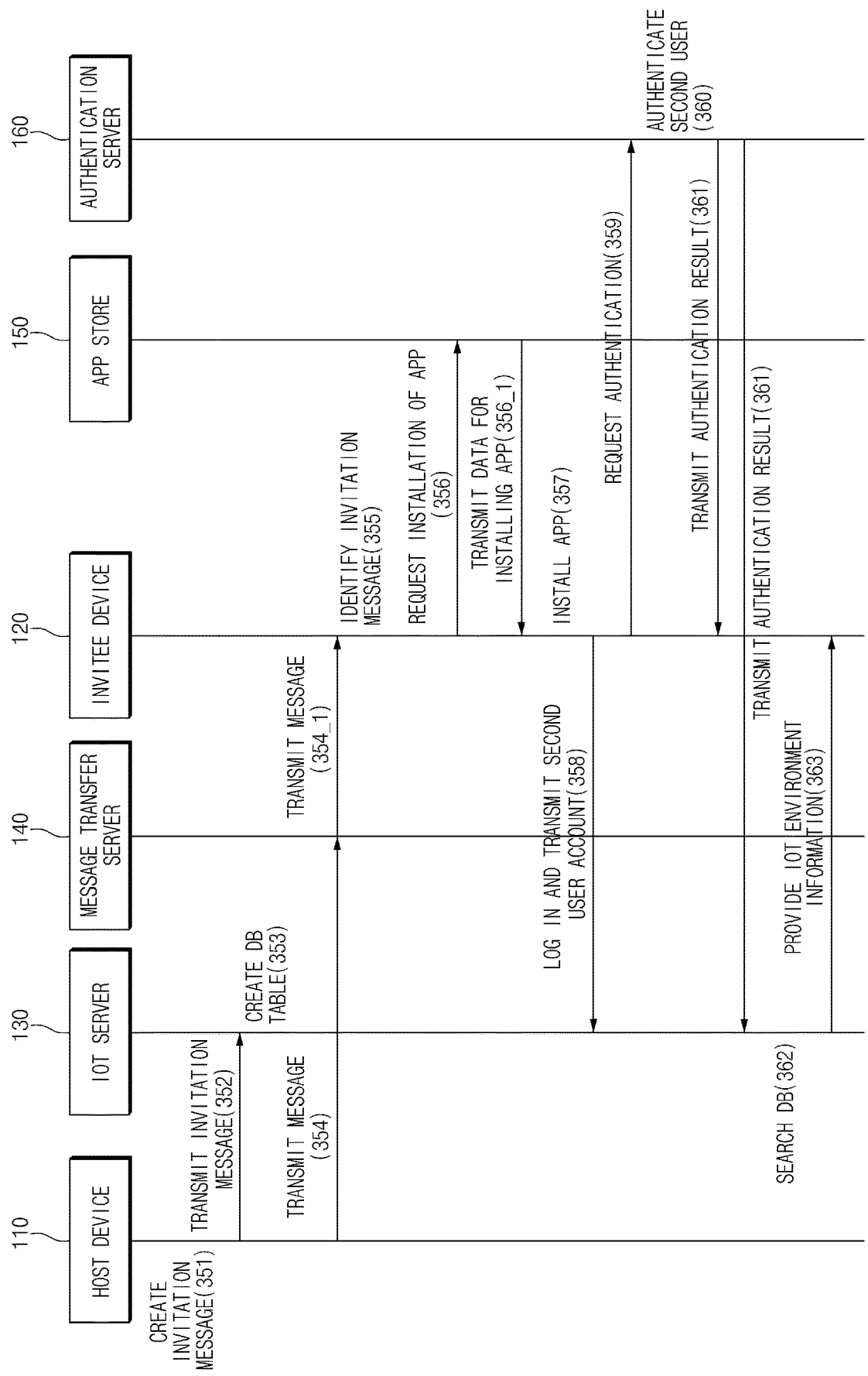
FIG. 3B is a signal flow diagram illustrating a process of sharing IoT environment information using identification information of an invitee device, according to various embodiments.

FIG. 3B is a signal flow diagram illustrating a process of sharing IoT environment information using identification information of an invitee device, according to various embodiments.

Referring to FIG. 3B, in operation 351, the host device 110 may create an invitation message by entering IoT environment information to be shared (e.g., an IoT device list or locations of IoT devices) and identification information (e.g., a telephone number) of the invitee device 120 into an IoT management app.

In operation 352, the host device 110 may transmit the created invitation message to the IoT server 130.

In operation 353, the IoT server 130 may create a database table based on the received invitation message.

In operations 354 and 354_1, the host device 110 may transmit the created invitation message to a message transfer server (e.g., the message transfer server 140 of FIG. 1B). The message transfer server 140 may transmit an SMS message corresponding to the invitation message to the invitee device 120. The invitation message may include identification information (e.g., a telephone number or a first user account) of the host device 110. The invitation message may include a URL for installing an IoT management app.

In operation 355, the invitee device 120 may identify the invitation message transmitted through the message transfer server 140. The invitee device 120 may determine whether an IoT management app is installed in the invitee device 120. For example, when the invitee device 120 receives, from a user, an input selecting the URL included in the invitation message, the invitee device 120 may determine whether an IoT management app is installed in the invitee device 120.

In the case where an IoT management app is not installed in the invitee device 120, the invitee device 120 may, in operations 356 and 356_1, connect to the application market server 150 and request data for installing an IoT management app.

In operation 357, the invitee device 120 may receive, from the application market server 150, data for installing the IoT management app and may install the IoT management app using the received data.

In operation 358, the invitee device 120 may log in to the IoT management app by using an account of a second user. According to an embodiment, the IoT management app may output a UI for creating an account.

According to various embodiments, in operation 359, the invitee device 120 may request an authentication server (e.g., the authentication server 160 of FIG. 1B) to authenticate the identification information (e.g., the telephone number) of the invitee device 120. For example, in the case where the invitee device 120 logs in to the IoT management app by using the second user's account in operation 358, the invitee device 120 may perform an authentication operation through the identification information (e.g., the telephone number).

In operation 360, the authentication server 160 may perform authentication on the telephone number of the invitee device 120.

In operation 361, the authentication server 160 may transmit the authentication result to the IoT server 130 and the invitee device 120.

In the case where the authentication result is valid, the IoT server 130 may, in operation 362, search for the identification information (e.g., the telephone number) of the invitee device 120 and update the DB table. The IoT server 130 may update the account information of the second user. According to an embodiment, the IoT server 130 may update the DB table created in operation 353, based on the second user's log-in information. The second user account information may have been newly recorded in the updated DB table, and accordingly, an update time may be modified. Also, the IoT server 130 may also enhance security by removing the identification information (e.g., the telephone number) of the invitee device 120 that is stored in the DB table.

In operation 363, the IoT server 130 may transmit the IoT environment information to the invitee device 120. The invitee device 120 may share control authority over at least some of the IoT devices managed by the host device 110, based on the received IoT environment information.

Figure 4:
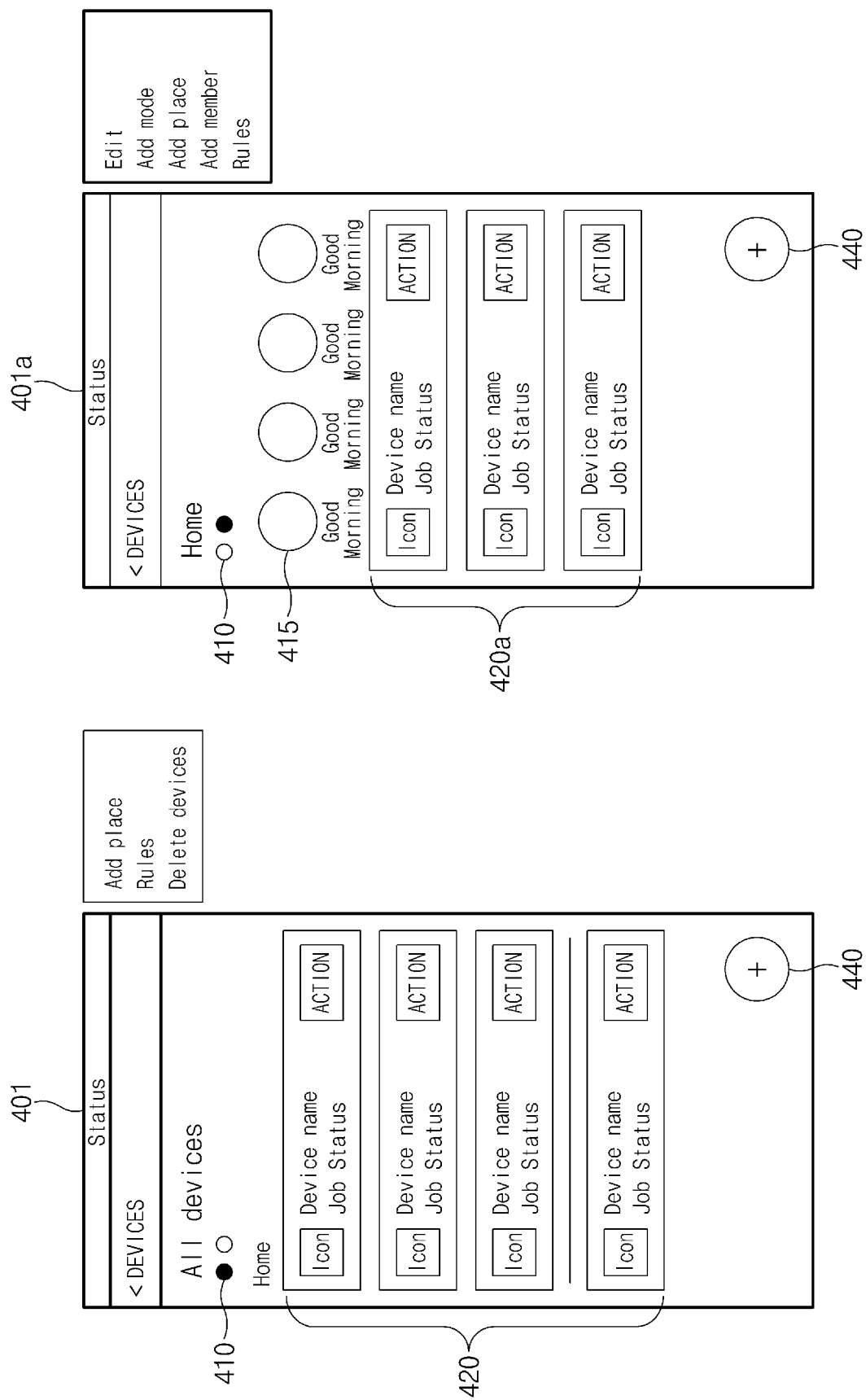
FIG. 4 illustrates a UI of an IoT management app according to various embodiments.

FIG. 4 illustrates a UI of an IoT management app according to various embodiments. FIG. 4 is merely illustrative, and the present disclosure is not limited thereto.

Referring to FIG. 4, an IoT management app may output a user interface 401 for managing a plurality of IoT devices. The user interface 401 may include a list of the plurality of IoT devices 420. The user interface 401 may display identification information or device type of each IoT device, or status information thereof (e.g., whether the IoT device is driven or not, a scheduled routine, or settings).

According to various embodiments, the user interface 401 may display the list of the IoT devices 420 by dividing the IoT devices into groups. FIG. 4 illustrates an example in which the IoT devices are grouped based on places where the IoT devices are located. It is understood of course that the present disclosure is not limited to this kind of grouping.

According to various embodiments, the user interface 401 may further include place tabs 410, an IoT device list 420, and/or a plus button 440.

The place tabs 410 may display place information (i.e., location information) set by the host device 110 and may allow a user to select each place. IoT devices located in the same location may be simultaneously or separately controlled.

When the user selects one of the place tabs 410, IoT devices included in the selected group may be displayed. For example, in the case where a "home" tab is selected, a user interface 401a related to IoT devices located in the home may be displayed. The user interface 401a may include a sub-device list 420a and a menu 415 for collectively controlling the group. The sub-device list 420a may correspond to at least some of the IoT devices included in the IoT device list 420.

The plus button 440 may be used to add an IoT device, a location, a user having new control authority, or a control mode. Additional information about adding a user having new control authority are illustrated in more detail below, in FIG. 5.

According to various embodiments, setting menus may be output differently, depending on a type of a selected place tab from among the tabs 410. For example, in the case where an "All devices" tab is selected from the place tabs 410, a list of "Add place," "Add function execution rule," and "Delete device" may be included in a setting menu. In the case where the "home" tab is selected from the place tabs 410, a list of "Add editing mode," "Add place," "Add member," and "Add function execution rule" may be included in a setting menu.

According to an embodiment, a tab created based on IoT environment information received from another device may not include a device addition item. Alternatively, at least some functions may be limited in the created tab. For example, a tab (e.g., Home of the host device 110) created based on IoT environment information received from the host device 110 by an IoT management app of the invitee device 120 may not have or be denied authority to perform more secure functions, such as editing a routine or register a routine.

According to various embodiments, the user interface 401 may further include a routine dash board (not illustrated). The routine dash board may be updated in the case where the host device 110 registers a routine. For example, the host device 110 may configure an air-conditioner to be turned on in the morning, and may configure a specific device to perform an operation, by identifying whether an event occurs.

According to various embodiments, the user interface 401 may further include a device dash board (not illustrated). The device dash board may display the name of a registered IoT device, information about the owner of the device, and an operation performed in the device.

Figure 5:
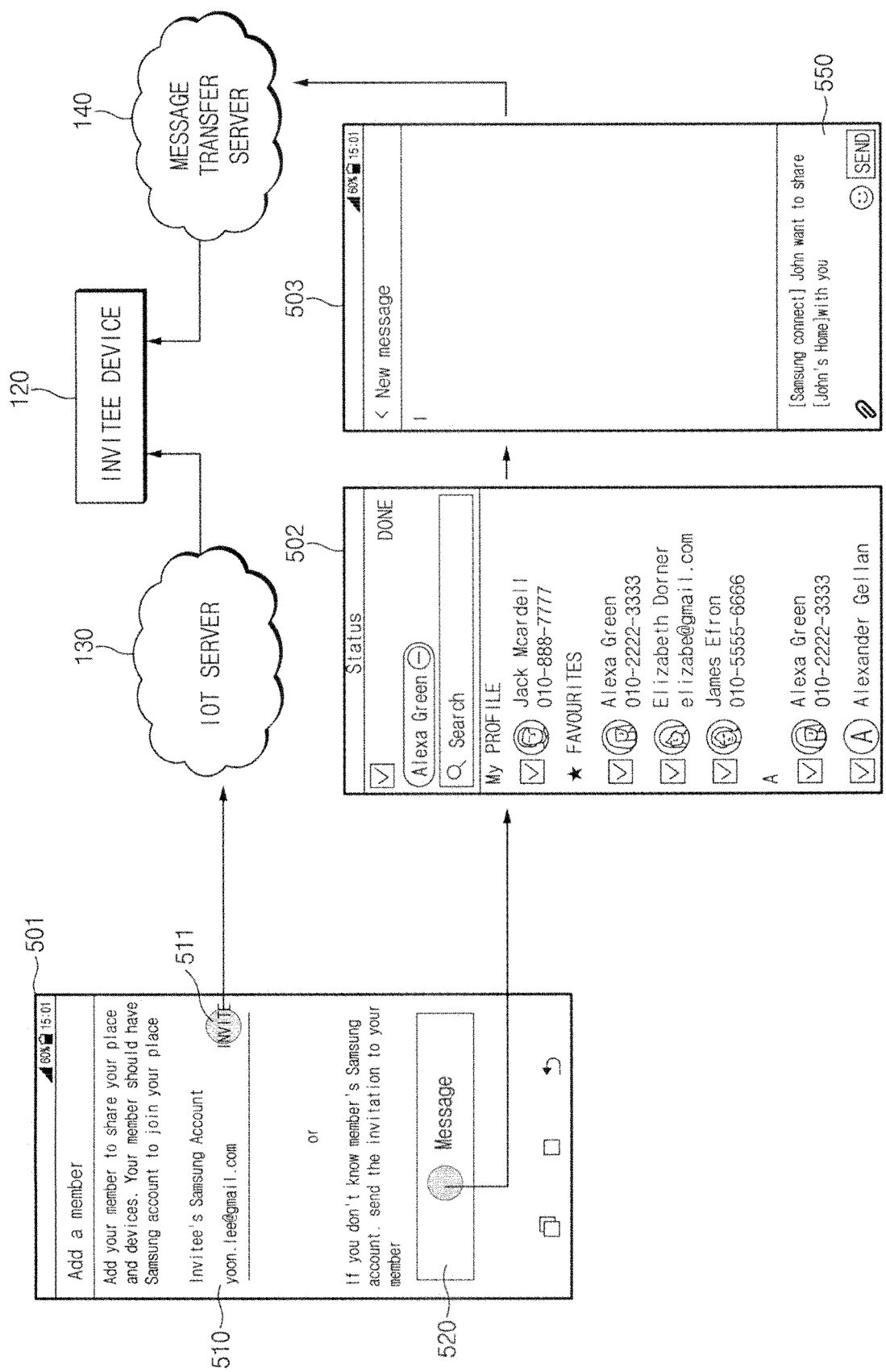
FIG. 5 illustrates a UI through which a host device transmits an invitation message, according to various embodiments.

FIG. 5 illustrates a UI through which a host device transmits an invitation message, according to various embodiments. FIG. 5 is merely illustrative, and the present disclosure is not limited thereto.

Referring to FIG. 5, the host device 110 may display an invitation message creation screen 501 when an input is detected requesting addition of a new user occurs (e.g., when a user selects "Add member" by selecting the plus button 440 of FIG. 4).

The invitation message creation screen 501 may include a UI for selecting a method of transmitting an invitation message. For example, the invitation message creation screen 501 may include a first field 510 into which a second user's account is entered, and a button 520 for selectable to request usage of an SMS message.

In the case where a first user desires to permit issuance of control authority to the second user using the second user's account, the first user may enter the second user's account into the first field 510 and select a confirmation icon or element 511. The second user's account may be responsively transmitted to an IoT server (e.g., the IoT server 130 of FIG. 1A).

The IoT server 130 may check validity of the second user's account input. In the case where data matching the second user's account is included in a database table, the IoT server 130 may transmit a push message to the invitee device 120 by using the matched data.

In the case where there is no data matching the second user's account in the database table, the IoT server 130 may notify, through a displayed pop-up window, the first user of the fact that the requested user (having no log-in history) is not registered in an IoT management app.

In an embodiment, in the case where the first user's account is entered into the first field 510 or the account of the second user having control authority is entered into the first field 510, the host device 110 may display an error message.

In an embodiment, a plurality of pieces of second user account information may be entered into the first field 510 through separators (e.g., "," or ";"). For example, in the case where a plurality of pieces of second user account information separated from one another by specified separators are entered into the first field 510 and the user selects the okay button 511, the plurality of pieces of second user account information may be transmitted to the IoT server 130.

The first user may use the message use button 520 in the case where the first user wants to transmit an invitation message by using an SMS message. In the case where the first user selects the message use button 520, the host device 110 may output an address book screen 502. The first user may select the second user's telephone number from the address book, or may directly enter the second user's telephone number.

The host device 110 may display a message editor screen 503, based on the second user's telephone number input. The message editor screen 503 may include an invitation message 550. For example, the invitation message 550 may include the name of the host device 110, the first user's account, information about places where IoT devices are located, and URL information for downloading an IoT management app or a related guide. According to an embodiment, the URL information may be created by the IoT management app or the IoT server and may be encrypted information.

In the case where the user selects a send button, the invitation message 550 may be transmitted to the invitee device 120 through a message transfer server (e.g., the message transfer server 140 of FIG. 1B).

According to various embodiments, the host device 110 may transmit sharing setting information (e.g., the first user account information, place information (or group information of IoT devices), IoT device information, the telephone number of the invitee device 120, or the time at which the invitation message was transmitted) to the IoT server 130 in the background. The IoT server 130 may create a database table, based on the received sharing setting information.

Figure 6:
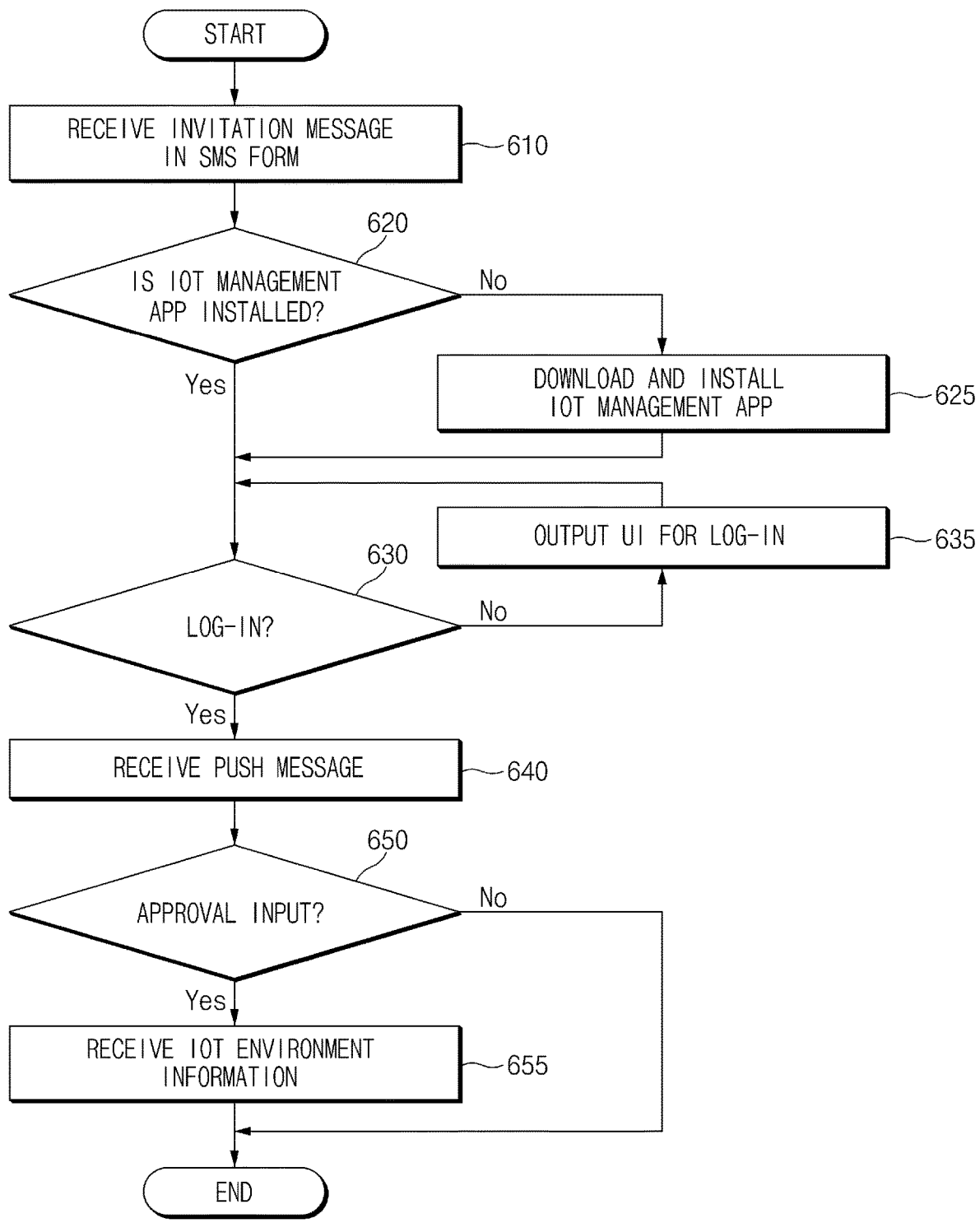
FIG. 6 is a flowchart in the case where an invitee device receives an invitation message in an SMS form, according to various embodiments.

FIG. 6 is a flowchart in the case where an invitee device receives an invitation message in an SMS form, according to various embodiments.

Referring to FIG. 6, in operation 610, an invitee device (e.g., the invitee device 120 of FIG. 1B) may receive an invitation message in an SMS form from a host device (e.g., the host device 110 of FIG. 1B). For example, the invitation message may be transmitted through a message transfer server (e.g., the message transfer server 140 of FIG. 1B). In an embodiment, the invitation message may be in a text or image format. The invitation message may include information associated with a first user or the host device 110 that initiated the invitation (e.g., a telephone number or the first user's account ID) or URL information for installing an IoT management app.

In operation 620, the invitee device 120 may determine whether the IoT management app specified in the invitation message is installed in the invitee device 120, based on an operation identifying the invitation message by a user. For example, in the case where a second user (e.g., the user of the invitee device 120) selects the URL information for installing the IoT management app, the invitee device 120 may determine whether the IoT management app is installed. In another example, the invitee device 120, when receiving the invitation message in an SMS form, may analyze text included in the SMS and may determine whether the IoT management app is installed.

In the case where the specified IoT management app is not installed in the invitee device 120, the invitee device 120 may, in operation 625, connect to the app market server 150 (e.g., Google Play Store or Apple App Store) according to an input of the second user (e.g., execution of a URL shortcut) to download and install the specified IoT management app.

In operation 630, the invitee device 120 may determine whether the invitee device 120 is logged in to the IoT management app by using the second user's account.

In the case where the invitee device 120 is not logged in to the IoT management app, the invitee device 120 may, in operation 635, output a user interface for log-in (e.g., a screen including a UI for entering account information or a UI for signing up for a membership).

According to an embodiment, in the case where the user identifies (or selects) the received invitation message in an SMS form in the state in which the invitee device 120 logs in to the IoT management app by using the second user's account, the invitee device 120 may automatically execute the IoT management app.

In the case where the invitee device 120 is logged in to the IoT management app, the invitee device 120 may, in operation 640, receive an invitation message in a push message form from the IoT server 130.

According to various embodiments, in operation 650, the invitee device 120 may determine whether the second user has generated an input approving the invitation. In the case where the second user rejects the invitation, the invitee device 120 may not obtain authority to control IoT devices managed by the host device 110. According to an embodiment, in the case where the invitee device 120 transmits rejection information to the IoT server 130, the IoT server 130 may remove information related to the invitation message from a database.

In the case where the second user generates an input approving the invitation, the invitee device 120 may, in operation 655, receive IoT environment information from the IoT server 130. The invitee device 120 may share at least a part of control authority of the host device 110 over the IoT devices. For example, the invitee device 120 may obtain control authority over at least one IoT device belonging to a group shared by the host device 110.

Figure 7:
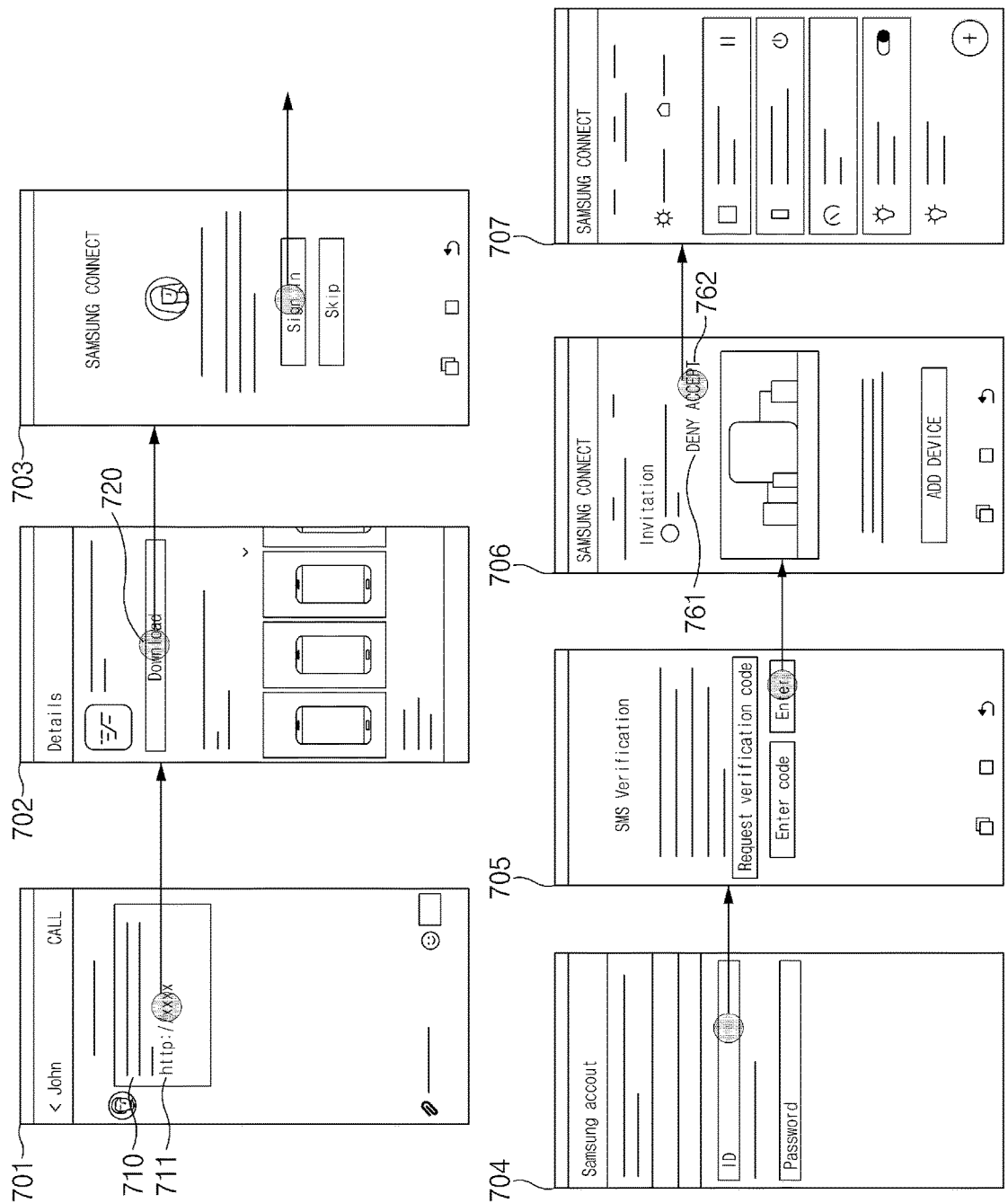
FIG. 7 illustrates a user interface of an invitee device that receives an SMS message as an invitation message, according to various embodiments.

FIG. 7 illustrates a user interface of an invitee device that receives an SMS message as an invitation message, according to various embodiments. FIG. 7 is merely illustrative, and the present disclosure is not limited thereto.

Referring to FIG. 7, on a screen 701, an invitee device (e.g., the invitee device 120 of FIG. 1B) may receive an invitation message 710. The invitation message 710 may include information (e.g., a telephone number or an account ID) of a first user or a host device (e.g., the host device 110 of FIG. 1B) that initiated the invitation. Also, the invitation message 710 may include URL information 711 for downloading an IoT management app. In an embodiment, the invitation message 710 may be implemented using text or an image.

On a screen 702, the invitee device 120 may display a page for downloading the IoT management app in the case where a user selects the information (e.g., the URL information 711) of the invitation message 710. The page may include display of an icon or element 720 selectable to imitate the download.

On a screen 703, the invitee device 120 may output a user interface for log-in (e.g., a UI for signing up for a membership) in the case where the invitee device 120 is not logged in to the IoT management app after the IoT management app has completed installation.

According to various embodiments, in the case where the IoT management app is installed in the invitee device 120 in advance, the processes corresponding to the screens 702 and 703 may be omitted.

On a screen 704, the invitee device 120 may output a user interface for receiving a user log-in. A second user may log in by entering a second user account and a password into the respective entry fields.

On a screen 705, the invitee device 120 may create an account to perform an SMS personal identification number or "PIN" authentication process in the case where the invitee device 120 logs in to the IoT management app for the first time. Based on the SMS PIN authentication result, the IoT server 130 may match and store, in a DB table, the telephone number of the invitee device 120 and the second user account of the IoT management app. According to various embodiments, the telephone number of the invitee device 120 may be removed from the DB table later. According to an embodiment, the information (e.g., the telephone number) of the second user that is used for the SMS PIN authentication process may be input by the second user or a system (e.g., an OS). For example, in the case where the information of the second user is input by the system, the information of the second user may be automatically input.

According to various embodiments, in the case where the invitee device 120 has previously logged in using the second user account, the process corresponding to the screen 705 may be omitted.

On a screen 706, the invitee device 120 may determine whether the second user approves the invitation. For example, the invitee device 120 may output a screen that includes a rejection button 761 and an approval button 762 each selectable to determine whether to approve sharing of IoT environment information. According to an embodiment, in the case where the second user receives a plurality of invitation messages from the first user or receives invitation messages from a plurality of users, the invitee device 120 may output the plurality of invitation messages sequentially (e.g., in the order that the invitation messages are received or with respect to the first user).

In the case where the second user selects the approval button 762 on the screen 706, the invitee device 120 may receive IoT environment information from the IoT server 130 and may provide a screen 707 for controlling IoT devices, based on the received information. The invitee device 120 may share at least a part of control authority of the host device 110 over the IoT devices.

In the case where the second user selects the rejection button 761 on the screen 706, the invitee device 120 may transmit an invitation rejection message (or signal) to the IoT server 130. The IoT server 130 may remove the invitation message from a database of the IoT server 130, based on the invitation rejection message.

Figure 8:
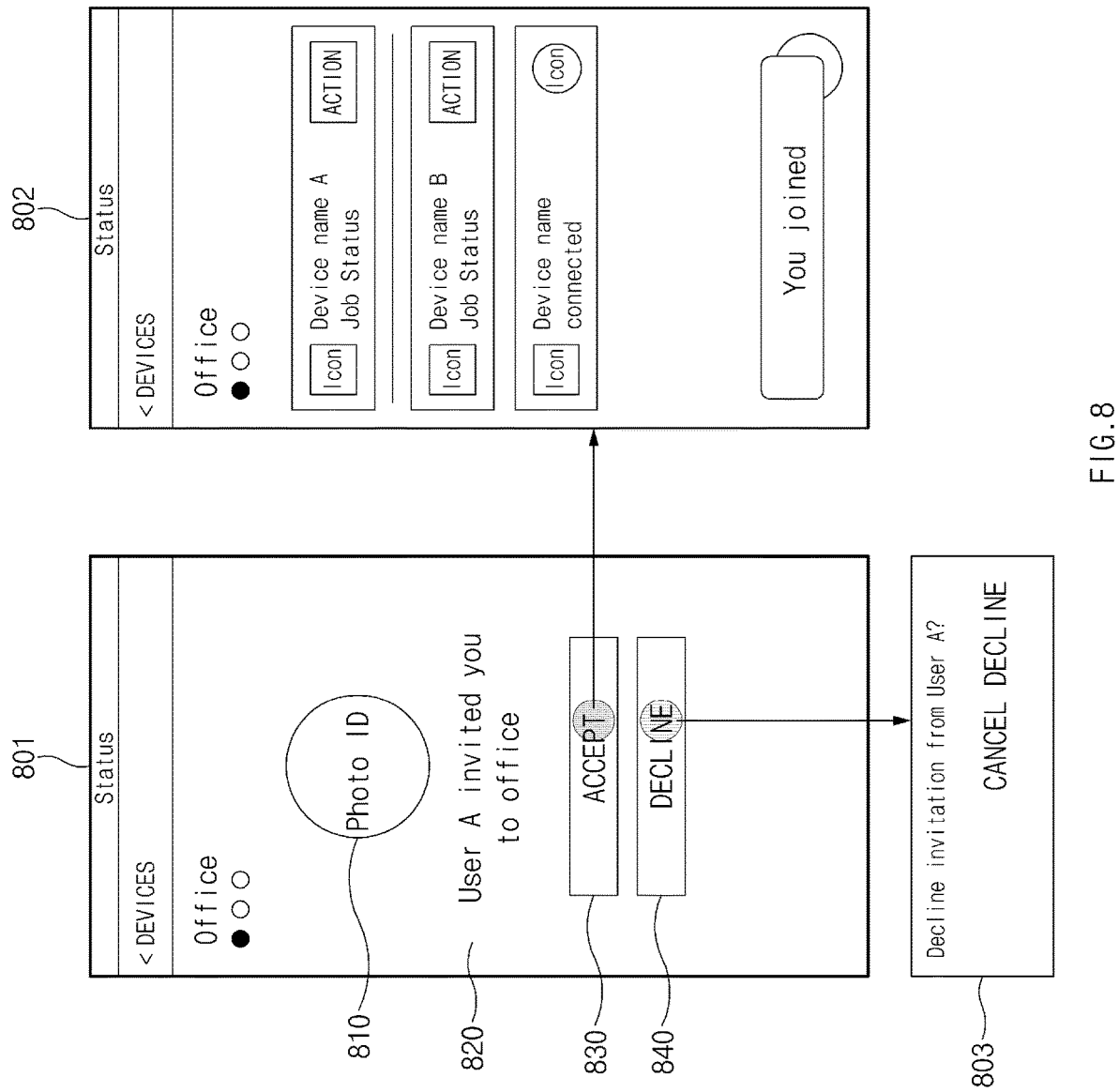
FIG. 8 illustrates a user interface for identifying an invitation message, according to various embodiments.

FIG. 8 illustrates a user interface for identifying an invitation message, according to various embodiments. FIG. 8 is merely illustrative, and the present disclosure is not limited thereto.

Referring to FIG. 8, an invitation message 801 may include first user information 810, an invitation guide 820, an approval button 830, and a rejection button 840. For example, the invitation message 801 may be output on the screen 706 of FIG. 7.

The first user information 810 may include information about a first user having transmitted the invitation message (e.g., an account ID, the name, or a profile picture of the first user) and information about the host device 110 (e.g., the telephone number).

The invitation guide 820 may include a simple introduction to a function, a greeting, or the like. The invitation guide 820 may include descriptions of a place of invitation, a device range, and the like.

The approval button 830 and the rejection button 840 may be selectable buttons for indicating whether to approve sharing of IoT environment information.

In the case where a second user selects the approval button 830, a user interface 802 for controlling IoT devices may be output. The second user may control the IoT devices displayed on the user interface 802.

In the case where the second user selects the rejection button 840, an additional dialogue 803 for confirming the rejection may be output. In the case where the rejection is selected once more, the invitee device 120 may not obtain authority to control the IoT devices managed by the host device 110. Information about the second user's selection of rejection may be transmitted to the IoT server 130. In an embodiment, the invitee device 120 may transmit, to the host device 110, an SMS message about the selection of rejection.

According to various embodiments, in the case where the invitee device 120 receives a plurality of invitation messages, the plurality of invitation messages may be displayed in a card form on a dashboard. For example, in the case where the invitee device 120 receives an invitation message of office and home from John and an invitation message of home from Paul, Office, Home, and Home tabs may be created on a dashboard, and the second user may approve or reject each invitation message.

The second user may create places in an IoT management app, may add various IoT devices to the created places (e.g., place tabs), and may manage the IoT devices. In various embodiments, the invitee device 120 may differently display (e.g., color, text, or icon) an IoT environment (e.g., a place tab) shared with the host device 110 and an IoT environment (e.g., a place tab) created by the invitee device 120.

Figure 9:
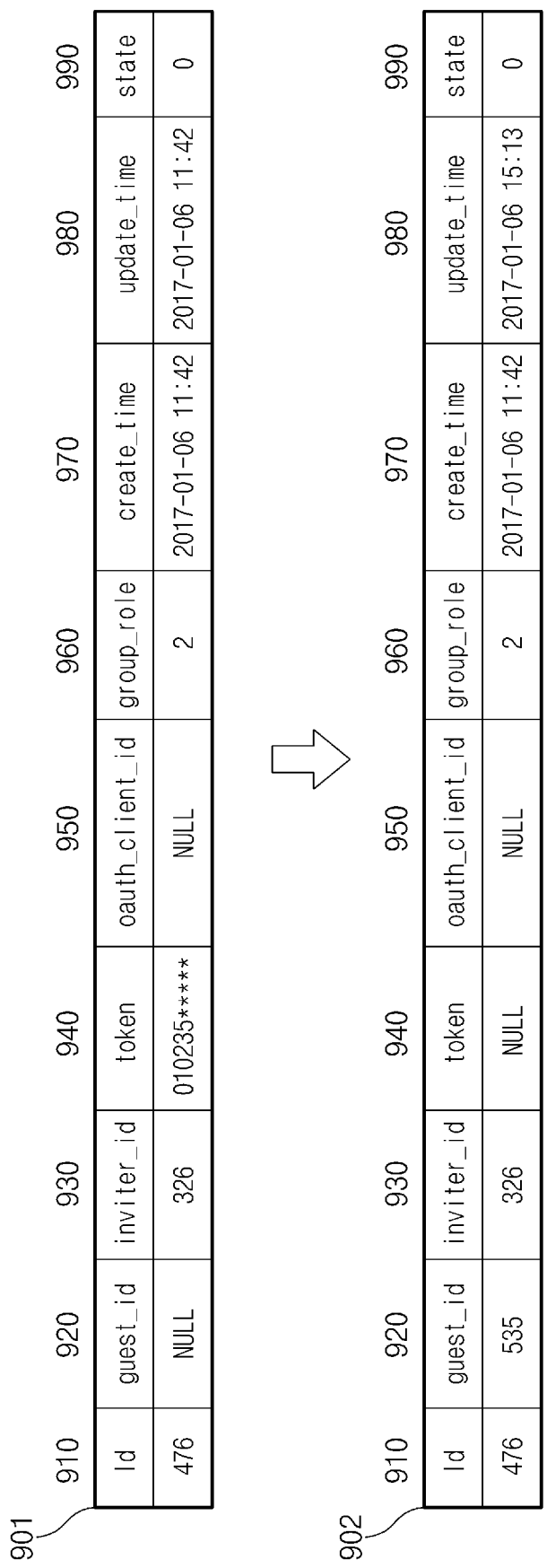
FIG. 9 illustrates a DB table stored in an IoT server, according to various embodiments.

FIG. 9 illustrates a DB table stored in an IoT server, according to various embodiments.

Referring to FIG. 9, the IoT server 130 may receive sharing setting information from the host device 110. The sharing setting information may include first user account information, place information (or group information of IoT devices), IoT device information, or information about the invitee device 120 (second user account information or a phone number). The IoT server 130 may create a DB table 901 based on the sharing setting information.

According to various embodiments, the DB table 901 may include a DB identifier 910, a second user account 920, a first user account 930, token information 940, authentication information 950, authority information 960, creation time 970, update time 980, and status information 990.

The DB identifier 910 may be identification information uniquely created for each invitation message.

The second user account 920 may be information that a second user of the invitee device 120 receiving the invitation message uses to log in to an IoT management app. According to an embodiment, the second user account 920 may have null information in the case where the invitation message is transmitted based on the telephone number of the invitee device 120.

The first user account 930 may be information that a first user of the host device 110 transmitting the invitation message uses to log in to the IoT management app.

The token information 940 may be identification information (e.g., a telephone number) used to identify the invitee device 120. For example, the token information 940 may be a field used to invite the invitee device 120 to the telephone number.

The authentication information 950 may be information related to authentication of the first user or the second user.

The authority information 960 may represent a range in which the host device 110 or the invitee device 120 is capable of managing or controlling IoT devices. For example, when the authority information 960 is set to "1", this may mean authority to control all registered IoT devices. When the authority information 960 is set to "2", this may mean authority to control IoT devices located in a specified place, among the registered IoT devices. According to an embodiment, the authority information 960 may include authority to edit (e.g., remove, add, or collectively control) an IoT device group shared by the host device 110.

The creation time 970 may be time when the DB table 901 was stored in the IoT server 130. The update time 980 may be time when the DB table 901 was updated last.

The status information 990 may be information representing whether the DB table 901 is available or not.

According to various embodiments, when the invitee device 120 logs in using the second user account, the IoT server 130 may update the DB table 901, based on the log-in information of the second user. The second user account 930, the token information 940, or the update time 980 may be modified in an updated DB table 902. According to an embodiment, in the case where data is stored in the second user account 930 (in the case where the second user account 930 is not Null), the IoT server 130 may remove the telephone number of the invitee device 120 from the token information 940 later (a Null status).

FIG. 9 is merely illustrative, and the present disclosure is not limited thereto. For example, in the case where the host device 110 transmits an invitation message by using a second user ID, the second user ID received from the host device 110 may be stored in the second user account 920. In this case, the token information 940 may have null information.

According to various embodiments, the IoT server 130 may store a separate database related to an IoT environment of the host device 110. For example, the IoT server 130 may store a database related to information about IoT devices registered in the host device 110, group information (e.g., place information) to which each of the IoT devices belongs, and the like.

Figure 10:
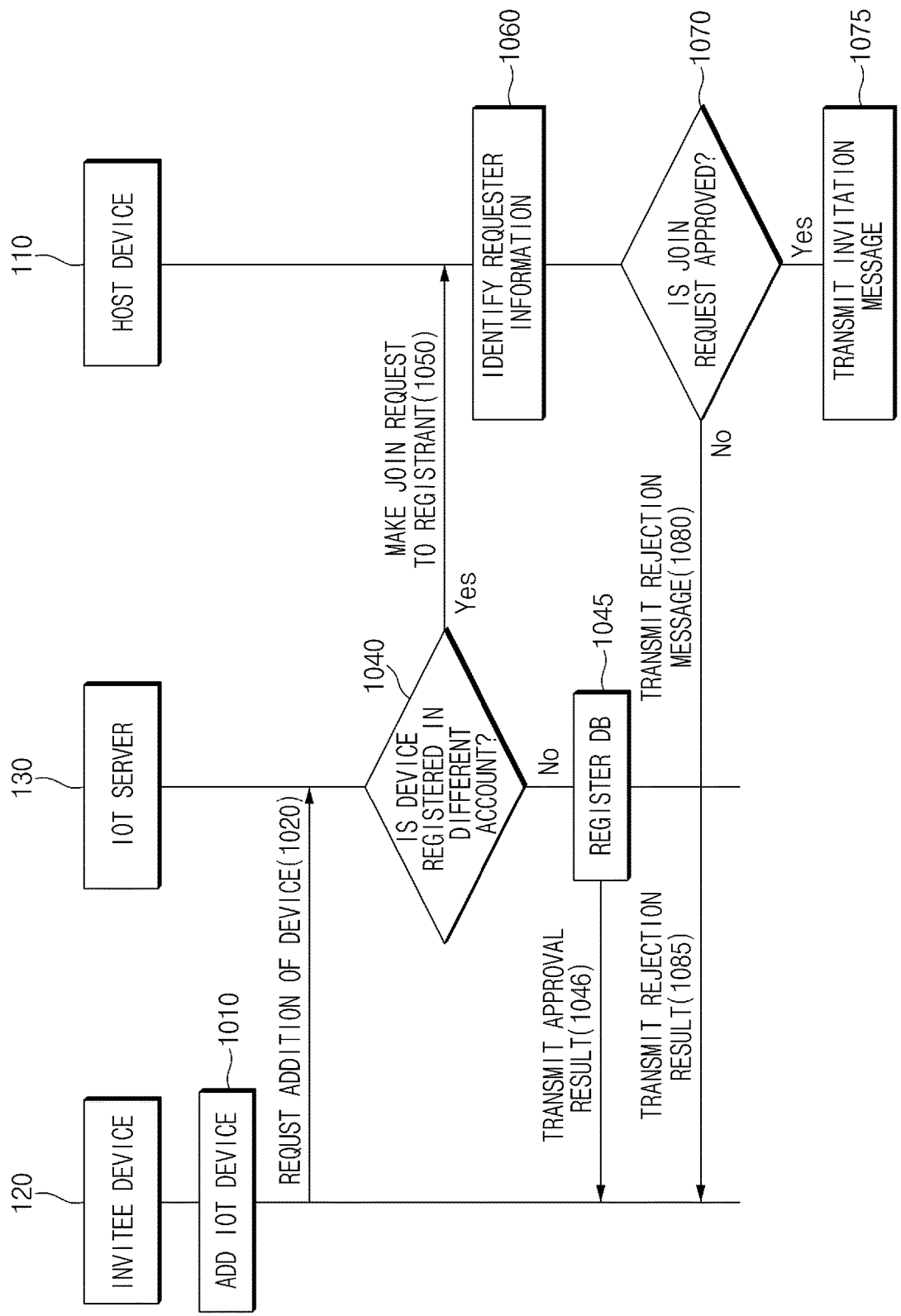
FIG. 10 is a signal flow diagram illustrating a process in which an invitee device makes a request to add a device, according to various embodiments.

FIG. 10 is a signal flow diagram illustrating a process in which an invitee device makes a request to add a device, according to various embodiments.

Referring to FIG. 10, in operation 1010, the invitee device 120 may receive a user input for adding at least one IoT device to control the IoT device. For example, the invitee device 120 may search for a nearby device through short-range communication (e.g., Bluetooth or Wi-Fi) and perform an operation registering the discovered device. According to an embodiment, the invitee device 120 may already have the IoT management app installed in the invitee device 120 and be logged in to the IoT management app using a second user account. For example, in the case where an edit button (a button for adding or removing a device) is selected in one screen (e.g., home) of the IoT management app of the invitee device 120, the invitee device 120 may initiate an operation of adding a nearby IoT device.

In operation 1020, the invitee device 120 may transmit a device addition request to the IoT server 130 to register the discovered device. The device addition request may include identification information of the IoT device to be added and the second user account information.

In operation 1040, the IoT server 130 may search a database for the identification information of the IoT device. According to an embodiment, in the case where the IoT server 130 receives the request for registering the IoT device, the IoT server 130 may determine whether the IoT device is registered to a different user account. For example, the IoT server 130 may allow one user to have top-level control authority over one IoT device. Accordingly, in the case where another user requests control authority over the same registered IoT device, the user obtains approval of the higher priority user registered in advance. In operation 1045, the IoT server 130 may register the IoT device in the second user account in the case where the IoT device is not registered in a different user account. The IoT server 130 may update information (e.g., identification information, device type, or group information (e.g., place information) about the newly added IoT device to a database related to IoT devices registered in the invitee device 120.

In operation 1046, the IoT server 130 may notify the invitee device 120 of the registration result. The invitee device 120 may control the corresponding IoT device using the IoT management app. According to an embodiment, a function of controlling the corresponding IoT device may be enabled in the IoT management app of the invitee device 120, or the invitee device 120 may download controllable data from the IoT server 130.

In operation 1050, the IoT server 130 may transmit a join request to the host device 110 in the case where the IoT device for which the invitee device 120 has requested registration is registered in a different user account (e.g., in a first user account of the host device 110). The join request may allow IoT environment information registered in the host device 110 to be shared with the invitee device 120 associated with the second user account.

In operation 1060, the host device 110 may identify the join request. For example, the host device 110 may identify, through a pop-up or a push message, a request for the host device 110 to share IoT environment information related to the corresponding IoT device with the invitee device 120 in which the second user account is registered.

In operation 1070, the host device 110 may determine whether approval of a first user is detected.

In operation 1075, the host device 110 may create and transmit an invitation message using the second user account in the case where there is an approval of the first user. For example, the host device 110 may create the invitation message based on the second user account and may transmit the invitation message to the IoT server 1030. In another example, the host device 110 may transmit, to the IoT server 130, a response message indicating that the host device 110 has approved the sharing request, and the IoT server 130 may provide authority to the invitee device 120, based on the response message.

According to various embodiments, the IoT server 130 may update the database related to the IoT devices registered in the host device 110 or the invitee device 120, based on the invitation message or the response message of the host device 110.

In operation 1080, the host device 110 may transmit a rejection message to the IoT server 130 in the case where no approval of the first user is detected.

In operation 1085, the IoT server 130 may transmit the rejection result to the invitee device 120.

Figure 11:
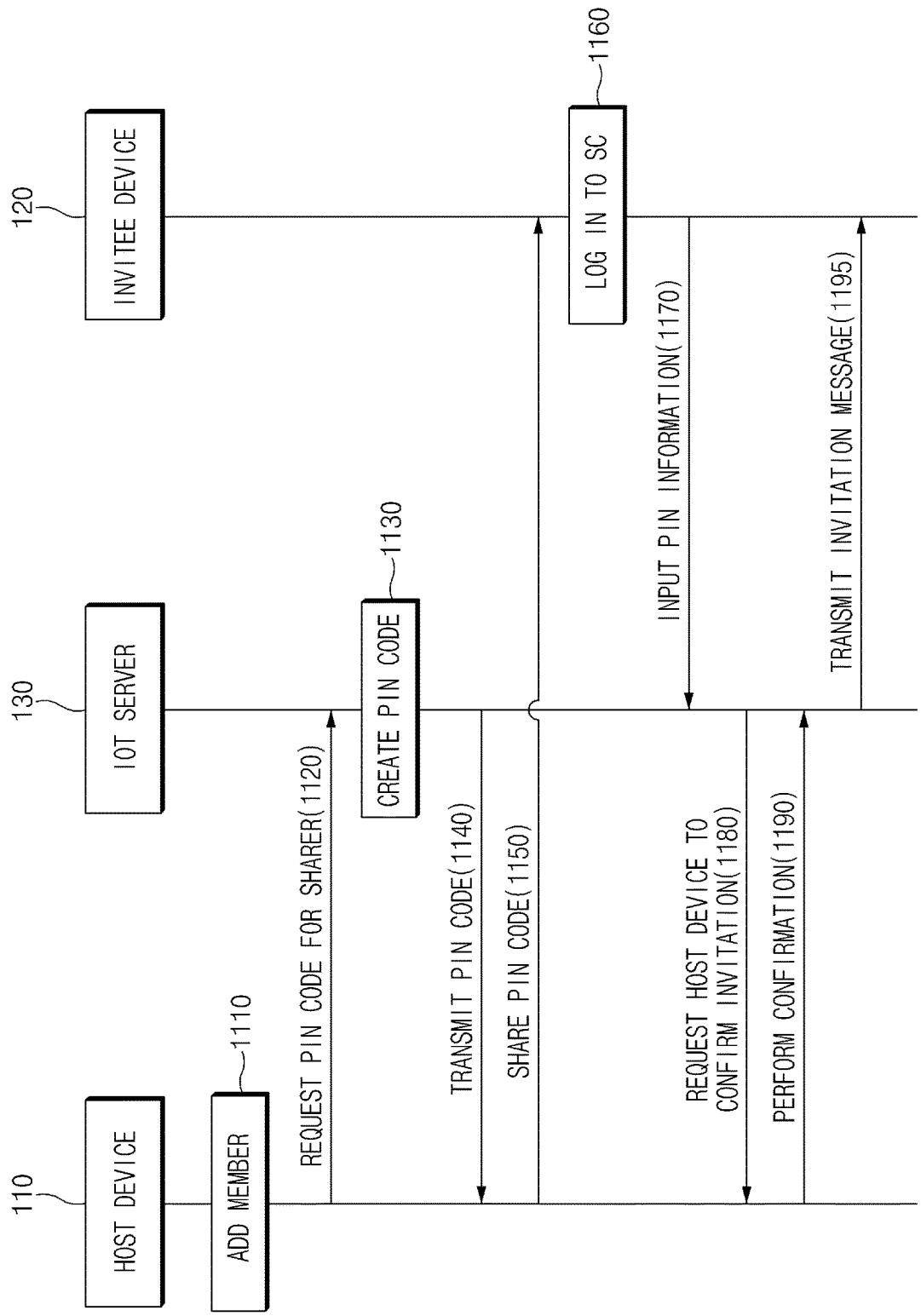
FIG. 11 illustrates a sharing process using short-range communication, according to various embodiments.
Figure 12:
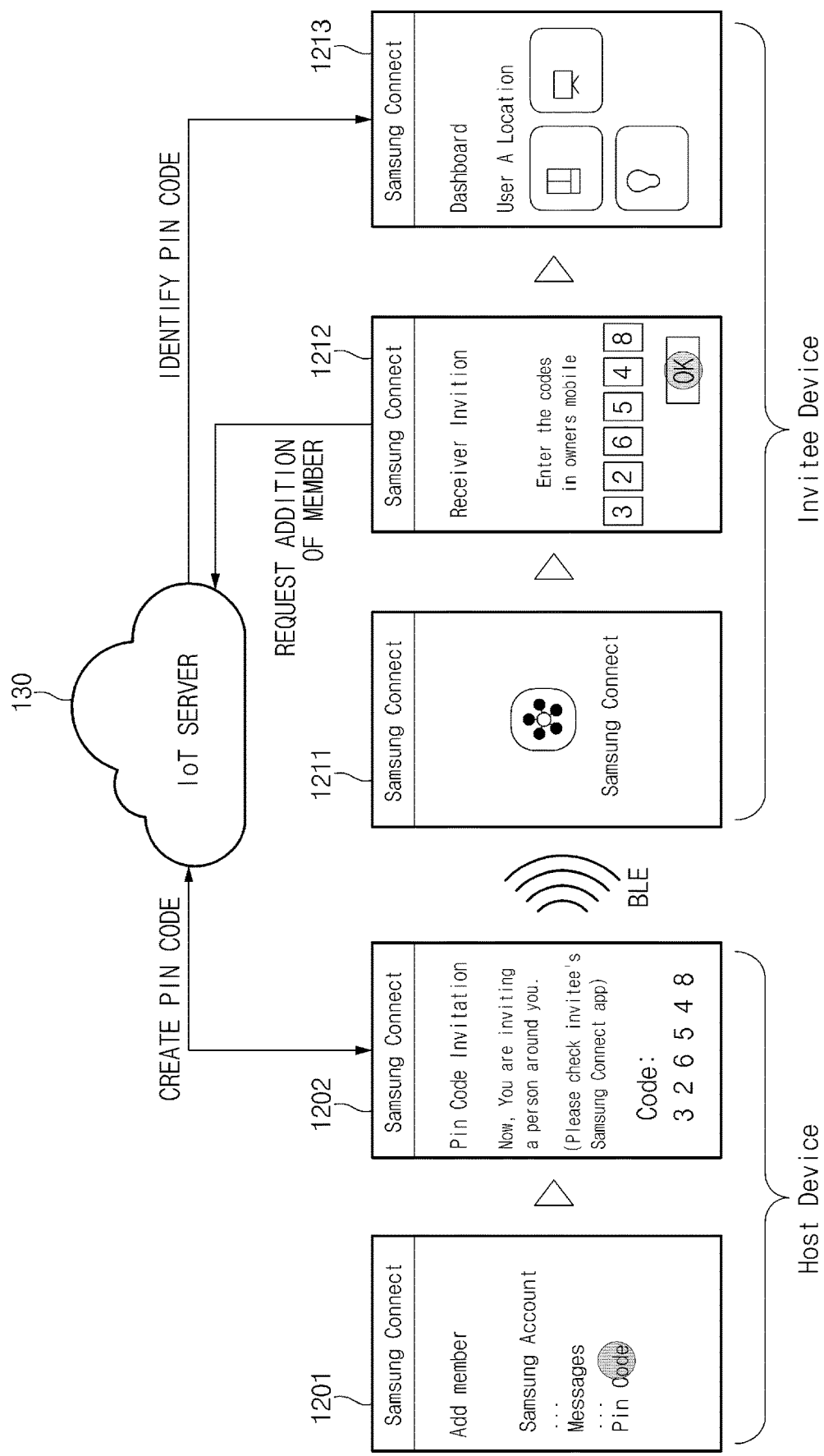
FIG. 12 illustrates a PIN code input UI using an IoT server, according to various embodiments.

FIG. 11 is a signal flow diagram illustrating a process of sharing IoT environment information using a security code, according to various embodiments. FIG. 12 illustrates a UI showing a process of sharing IoT environment information using a security code, according to various embodiments.

Referring to FIGS. 11 and 12, the host device 110 may transmit an invitation message to the invitee device 120 within a close distance by which short-range communication (e.g., BLE communication, NFC communication, or the like) is possible, by using short-range communication. The host device 110, the IoT server 130, and the invitee device 120 may perform an invitation operation based on the same security code (e.g., PIN code). The host device 110 may receive a security code (e.g., a PIN code) from the IoT server 130 and may share IoT environment information with the invitee device 120 by using the received security code. Although the following description will be focused on a case where a security code is PIN information, the present disclosure is not limited thereto.

In operation 1110, the host device 110 may receive a user input for adding a second user (or the invitee device 120) (Screen 1201).

In operation 1120, the host device 110 may request a PIN code from the IoT server 130.

In operation 1130, the IoT server 130 may create a PIN code. In an embodiment, the IoT server 130 may create a PIN code having a preset number of digits (e.g., eight digits) or a PIN code valid for a specified period of time (e.g., three minutes) to enhance security.

According to various embodiments, the IoT server 130 may create a PIN code based on sharing setting information received from the host device 110. The sharing setting information may include first user account information, place information (or group information of IoT devices), or IoT device information.

In operation 1140, the IoT server 130 may transmit the created PIN code to the host device 110 (Screen 1202).

In operation 1150, the host device 110 may share the received PIN code with the invitee device 120 (Screen 1211). For example, the host device 110 may transmit the PIN code to the invitee device 120 through short-range communication, such as Bluetooth Low Energy or "BLE". According to an embodiment, a first user may show the PIN code to the second user and may allow the second user to directly input the PIN code.

According to various embodiments, the host device 110 may add a separate dummy code to the received PIN code and may share the PIN code having the dummy code added thereto with the invitee device 120 through short-range communication, such as BLE.

In operation 1160, the invitee device 120 may log in to an IoT management app.

In operation 1170, the invitee device 120 may request an invitation message from the IoT server 130 by using the PIN code (Screen 1212).

In operation 1180, the IoT server 130 may request the host device 110 to confirm the invitation.

In operation 1190, the host device 110 may transmit the confirmation result to the IoT server 130.

According to various embodiments, operations 1180 and 1190 may be omitted. For example, in the case where the PIN code is valid, the IoT server 130 may transmit an invitation message without a separate confirmation process.

In operation 1195, the IoT server 130 may transmit an invitation message to the invitee device 120. The invitee device 120 may share IoT environment information with the host device 110. The invitee device 120 may control various IoT devices according to the IoT environment information (Screen 1213).

Figure 13:
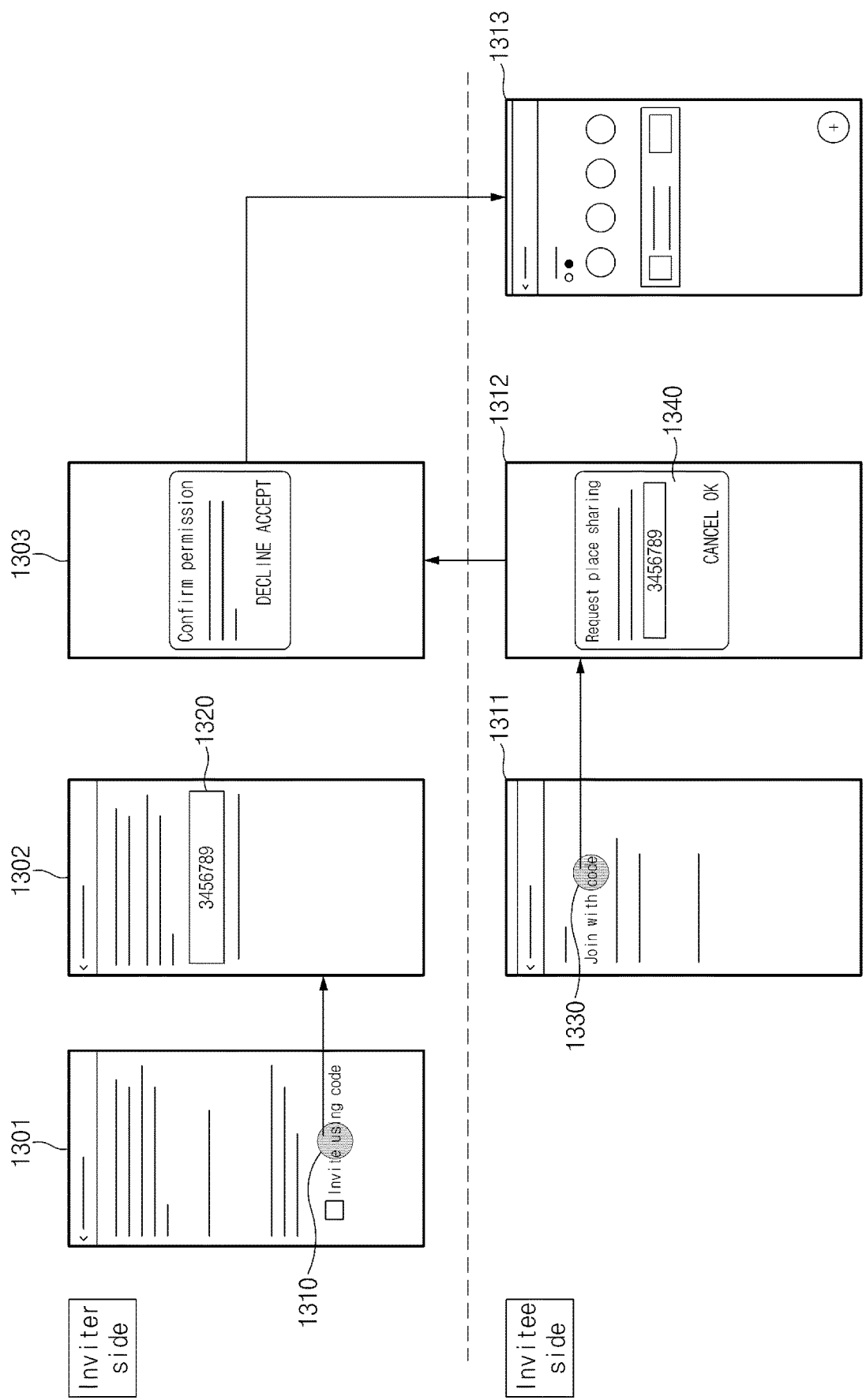
FIG. 13 illustrates a UI showing a process in which a host device and an invitee device share a PIN code, according to various embodiments.

FIG. 13 illustrates a UI showing a process in which a host device and an invitee device share a security code, according to various embodiments.

Referring to FIG. 13, the host device 110 may receive a user input for adding a second user (or the invitee device 120) (Screen 1301). In the case where a first user selects a code creation button 1310, a security code 1320 may be created depending on a specified algorithm (Screen 1302). According to an embodiment, the security code 1320 may be valid for a predetermined period of time (e.g., about one minute), or may be valid a predetermined number of times (e.g., once).

The invitee device 120 may receive a user input to press a button 1330 for performing a join request through a code input (Screen 1311).

The invitee device 120 may output a user interface including a code input field 1340 (Screen 1312). The second user may enter, into the code input field 1340, a security code provided by the first user.

According to an embodiment, the invitee device 120 may request the IoT server 130 to check validity of the security code entered into the code input field 1340 by the invitee device 120. In the case where the input security code is valid, the IoT server 130 may transmit, to the host device 110, a message to request an approval input of the first user. The host device 110 may display a screen for the approval request received from the IoT server 130 (Screen 1303). In the case where the approval input of the first user occurs in the host device 110, the host device 110 may share IoT environment information with invitee device 120 through the IoT server 130.

According to an embodiment, the host device 110 may check validity of the security code entered into the code input field 1340 of the invitee device 120, by using short-range communication (Screen 1303). For example, the host device 110 may receive, through BLE communication, the security code entered into the code input field 1340 of the invitee device 120. In the case where the received security code matches a security code stored in the host device 110 and the approval input of the first user occurs, the host device 110 may share IoT environment information with invitee device 120 through the IoT server 130.

The invitee device 120 may control various IoT devices, based on the IoT environment information received through the IoT server 130 (Screen 1313).

According to various embodiments, in the case where the host device 110 starts the process of sharing the IoT environment information with the invitee device 120 in the state in which a specified place (e.g., home) is selected, IoT environment information related to the corresponding place may be shared, and IoT environment information related to a different place (e.g., office) may not be shared. For example, the IoT server 130 may transmit, to the invitee device 120, information (e.g., a place, group information, or IoT device information) to be shared, based on information (e.g., a place, a group, or IoT device information) on the basis of which the host device 110 creates the security code.

Figure 14:
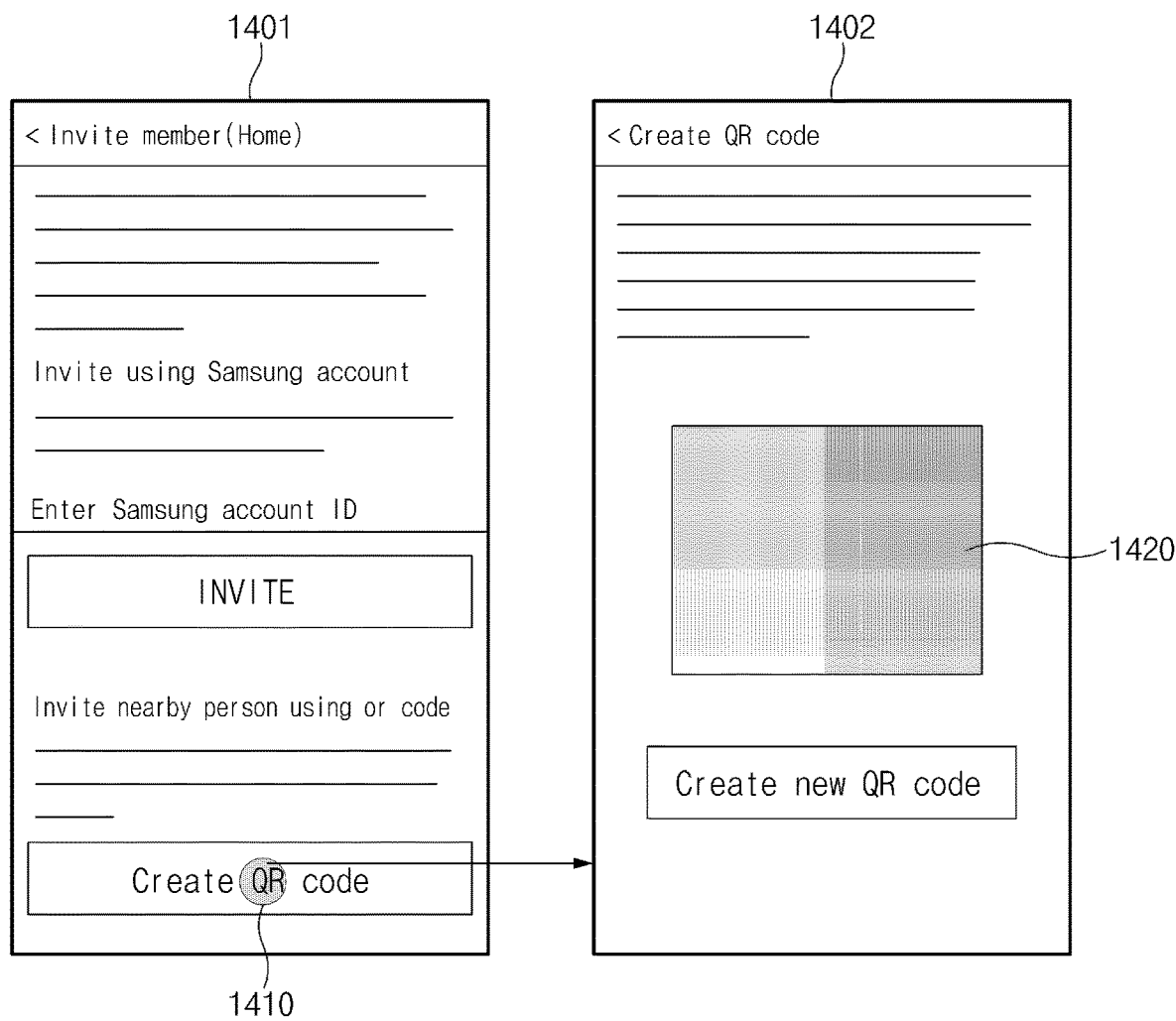
FIG. 14 illustrates an invitation UI using a QR code, according to various embodiments.

FIG. 14 illustrates an invitation UI using a quick response or "QR" code, according to various embodiments.

Referring to FIG. 14, the host device 110 may output a member addition screen 1401 in the case where the host device 110 receives a user input related to addition of a member (e.g., an input for sharing, with a second user (or the invitee device 120), authority over IoT devices being managed).

The member addition screen 1401 may include various methods for adding a member. For example, the member addition screen 1401 may include a method of adding a member by inputting a second user account or a method of adding a member by creating a QR code.

According to an embodiment, in the case where a user selects a QR code creation button 1410, the host device 110 may output a QR code 1420 related to IoT environment information (Screen 1402). The invitee device 120 may share the IoT environment information by recognizing the QR code 1420 output by the host device 110. According to an embodiment, the QR code 1420 may be created by the host device 110, based on information of the host device 110 and an IoT device group (or location) to be shared. According to another embodiment, the host device 110 may receive, from the IoT server 130, a QR code created based on the information of the host device 110 and the IoT device group (or location) to be shared, and may output the QR code. The IoT server 130 may create a QR code based on sharing setting information received from the host device 110. The sharing setting information may include first user account information, place information (or group information of IoT devices), or IoT device information.

The invitee device 120 may output a UI capable of recognizing a QR code. For example, the invitee device 120 may recognize the QR code 1420 displayed on a display of the host device 110, by using a camera.

In the case where the invitee device 120 recognizes the QR code, information about the QR code may be automatically shared with the IoT server 130, and an invitation message related to the corresponding QR code may be transmitted to the invitee device 120.

Figure 15:
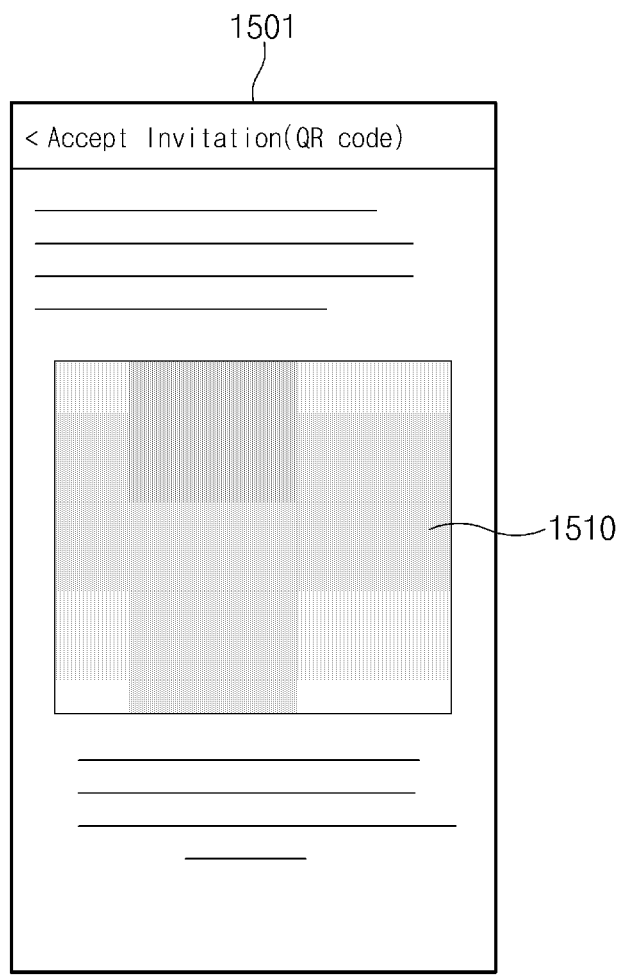
FIG. 15 illustrates a join UI using a QR code, according to various embodiments.

FIG. 15 illustrates a join UI using a QR code, according to various embodiments.

Referring to FIG. 15, the invitee device 120 may output a user interface 1501 for recognizing a QR code (e.g., the QR code 1420 of FIG. 14) that is output on a display of the host device 110. The invitee device 120 may output a recognition area 1510 for recognizing a QR code by using a camera module.

According to various embodiments, the invitee device 120 may automatically output the user interface 1501 according to a specified condition. For example, in the case where the invitee device 120 and the host device 110 are located in the same space (e.g., within a distance by which short-range communication is possible), the invitee device 120 may recognize the host device 110 through short-range communication and may automatically output the user interface 1501 including the recognition area 1510. A first user and a second user may simply and conveniently share IoT environment information by using a QR code.

According to various embodiments, the invitee device 120 may output the user interface 1501 for recognizing a QR code, based on the second user's selection.

Figure 16:
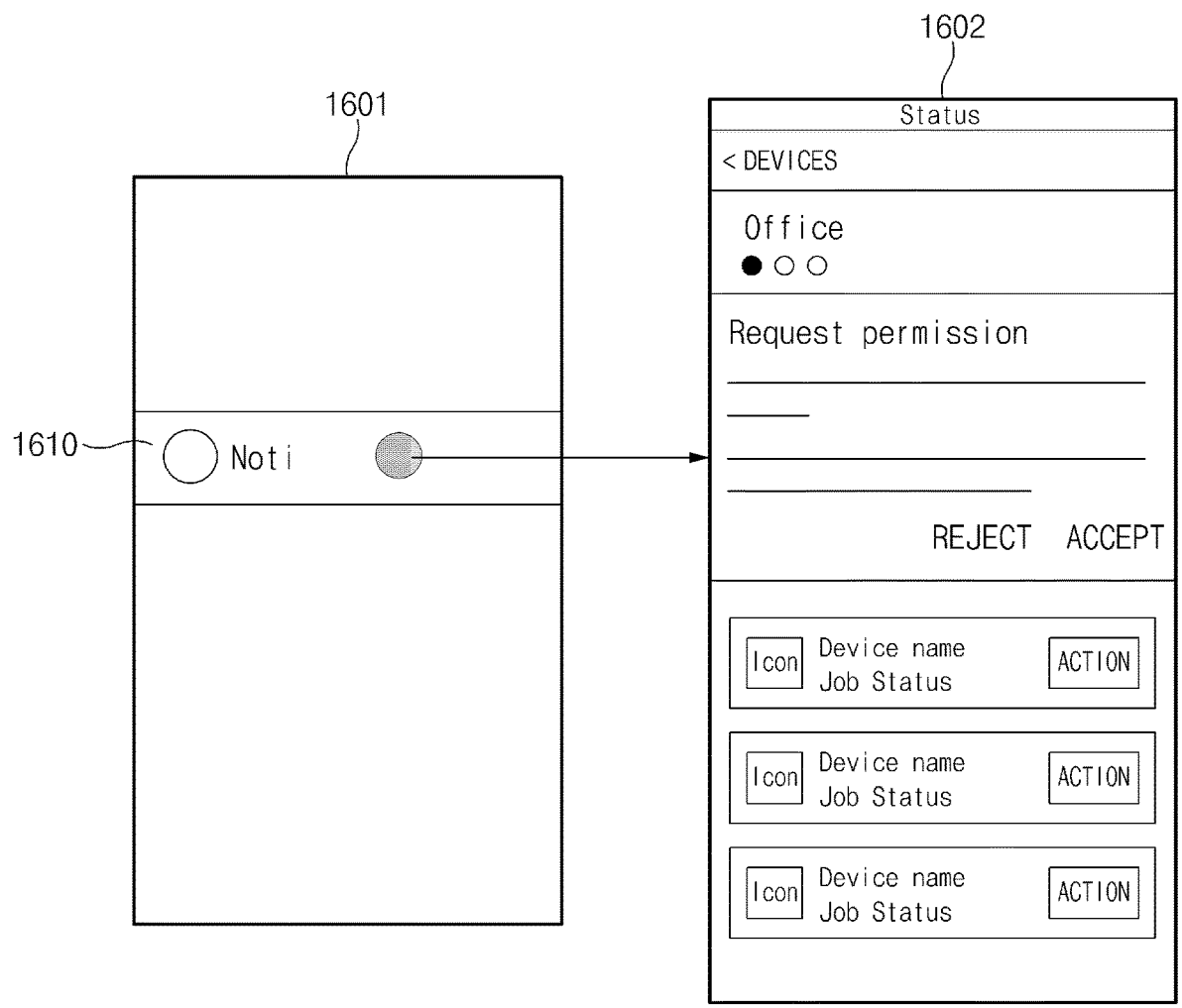
FIG. 16 illustrates a UI for setting authority, according to various embodiments.

FIG. 16 illustrates a UI for setting authority, according to various embodiments.

Referring to FIG. 16, the IoT server 130 may allow one user to have top-level control authority over one IoT device. Accordingly, in the case where another user wants to have a control authority over a registered IoT device, the user may have to obtain an approval of a user registered in advance.

According to an embodiment, in the case where the IoT server 130 receives, from the invitee device 120, a registration request for an IoT device in which a first user (e.g., a user of the host device 110) is already registered, the IoT server 130 may send the first user a notification message (e.g., a push message) for requesting authority. For example, as shown on a screen 1601, the IoT server 130 may inform, through a notification message 1610, the host device 110 that the invitee device 120 requests (e.g., join request) authority over the IoT device registered in the host device 110. The request may be a request for allowing setting information related to the IoT device registered in the host device 110 to be shared with the invitee device 120 associated with a second user account.

In the case where a user selects the notification message 1610, the host device 110 may output a user interface for determining whether to share IoT environment information with the invitee device 120 as seen in screen 1602.

In the case where the user generates an input for approving the sharing, the host device 110 may transmit, to the IoT server 130, a response message that the host device 110 approves the sharing request, and the IoT server 130 may provide authority to the invitee device 120, based on the response message.

In the case where the user generates an input for rejecting the sharing, the host device 110 may transmit, to the IoT server 130, a response message that the host device 110 rejects the sharing request, and the IoT server 130 may inform the invitee device 120 that authority cannot be assigned to the invitee device 120, based on the response message.

Figure 17:
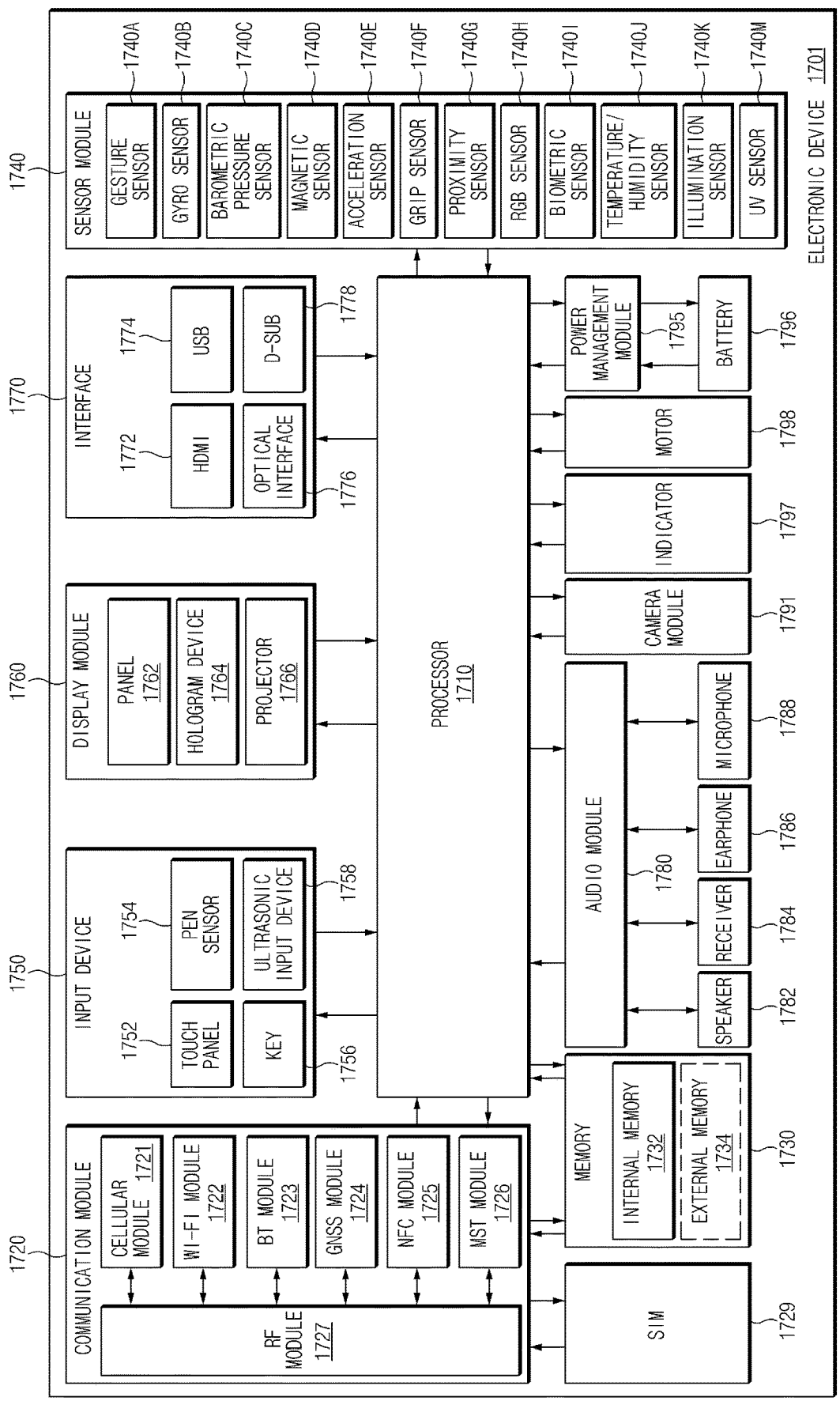
FIG. 17 is a block diagram of an electronic device according to various embodiments.

FIG. 17 is a block diagram illustrating an electronic device according to an embodiment of the present disclosure.

Referring to FIG. 17, an electronic device 1701 may include, for example, a part or the entirety of the host device 110 illustrated in FIG. 1A. The electronic device 1701 may include at least one processor (e.g., AP) 1710, a communication module 1720, a subscriber identification module (SIM) 1729, a memory 1730, a sensor module 1740, an input device 1750, a display 1760, an interface 1770, an audio module 1780, a camera module 1791, a power management module 1795, a battery 1796, an indicator 1797, and a motor 1798.

The processor 1710 may run an operating system or an application program so as to control a plurality of hardware or software elements connected to the processor 1710, and may process various data and perform operations. The processor 1710 may be implemented with, for example, a system on chip (SoC). According to an embodiment of the present disclosure, the processor 1710 may further include a graphic processing unit (GPU) and/or an image signal processor. The processor 1710 may include at least a portion (e.g., a cellular module 1721) of the elements illustrated in FIG. 17. The processor 1710 may load, on a volatile memory, an instruction or data received from at least one of other elements (e.g., a nonvolatile memory) to process the instruction or data, and may store various data in a nonvolatile memory.

The communication module 1720 may have a configuration that is the same as or similar to that of the communication interface 170 of FIG. 1. The communication module 1720 may include, for example, a cellular module 1721, a Wi-Fi module 1722, a Bluetooth (BT) module 1723, a GNSS module 1724 (e.g., a GPS module, a GLONASS module, a BeiDou module, or a Galileo module), a NFC module 1725, MST module 1726 and a radio frequency (RF) module 1727.

The cellular module 1721 may provide, for example, a voice call service, a video call service, a text message service, or an Internet service through a communication network. The cellular module 1721 may identify and authenticate the electronic device 1701 in the communication network using the subscriber identification module 1729 (e.g., a SIM card). The cellular module 1721 may perform at least a part of functions that may be provided by the processor 1710. The cellular module 1721 may include a communication processor (CP).

Each of the Wi-Fi module 1722, the Bluetooth module 1723, the GNSS module 1724 and the NFC module 1725 may include, for example, a processor for processing data transmitted/received through the modules. According to some various embodiments of the present disclosure, at least a part (e.g., two or more) of the cellular module 1721, the Wi-Fi module 1722, the Bluetooth module 1723, the GNSS module 1724, and the NFC module 1725 may be included in a single integrated chip (IC) or IC package.

The RF module 1727 may transmit/receive, for example, communication signals (e.g., RF signals). The RF module 1727 may include, for example, a transceiver, a power amp module (PAM), a frequency filter, a low noise amplifier (LNA), an antenna, or the like. According to another embodiment of the present disclosure, at least one of the cellular module 1721, the Wi-Fi module 1722, the Bluetooth module 1723, the GNSS module 1724, or the NFC module 1725 may transmit/receive RF signals through a separate RF module.

The SIM 1729 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1730 may include, for example, an internal memory 1732 or an external memory 1734. The internal memory 1732 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1734 may include a flash drive such as a compact flash (CF), a secure digital (SD), a Micro-SD, a Mini-SD, an extreme digital (xD), a MultiMediaCard (MMC), a memory stick, or the like. The external memory 1734 may be operatively and/or physically connected to the electronic device 1701 through various interfaces.

The sensor module 1740 may, for example, measure physical quantity or detect an operation state of the electronic device 1701 so as to convert measured or detected information into an electrical signal. The sensor module 1740 may include, for example, at least one of a gesture sensor 1740A, a gyro sensor 1740B, a barometric pressure sensor 1740C, a magnetic sensor 1740D, an acceleration sensor 1740E, a grip sensor 1740F, a proximity sensor 1740G, a color sensor 1740H (e.g., a red/green/blue (RGB) sensor), a biometric sensor 1740I, a temperature/humidity sensor 1740J, an illumination sensor 1740K, or an ultraviolet (UV) sensor 1740M. Additionally or alternatively, the sensor module 1740 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1740 may further include a control circuit for controlling at least one sensor included therein. In some various embodiments of the present disclosure, the electronic device 1701 may further include a processor configured to control the sensor module 1740 as a part of the processor 1710 or separately, so that the sensor module 1740 is controlled while the processor 1710 is in a sleep state.

The input device 1750 may include, for example, a touch panel 1752, a (digital) pen sensor 1754, a key 1756, or an ultrasonic input device 1758. The touch panel 1752 may employ at least one of capacitive, resistive, infrared, and ultraviolet sensing methods. The touch panel 1752 may further include a control circuit. The touch panel 1752 may further include a tactile layer so as to provide a haptic feedback to a user.

The (digital) pen sensor 1754 may include, for example, a sheet for recognition which is a part of a touch panel or is separate. The key 1756 may include, for example, a physical button, an optical button, or a keypad. The ultrasonic input device 1758 may sense ultrasonic waves generated by an input tool through a microphone 1788 so as to identify data corresponding to the ultrasonic waves sensed.

The display 1760 may include a panel 1762, a hologram device 1764, or a projector 1766. The panel 1762 may be, for example, flexible, transparent, or wearable. The panel 1762 and the touch panel 1752 may be integrated into a single module. The hologram device 1764 may display a stereoscopic image in a space using a light interference phenomenon. The projector 1766 may project light onto a screen so as to display an image. The screen may be disposed in the inside or the outside of the electronic device 1701. According to an embodiment of the present disclosure, the display 1760 may further include a control circuit for controlling the panel 1762, the hologram device 1764, or the projector 1766.

The interface 1770 may include, for example, an HDMI 1772, a USB 1774, an optical interface 1776, or a D-sub-miniature (D-sub) 1778. Additionally or alternatively, the interface 1770 may include, for example, a mobile high-definition link (MHL) interface, an SD card/multi-media card (MMC) interface, or an infrared data association (IrDA) interface.

The audio module 1780 may convert, for example, a sound into an electrical signal or vice versa. The audio module 1780 may process sound information input or output through a speaker 1782, a receiver 1784, an earphone 1786, or the microphone 1788.

The camera module 1791 is, for example, a device for shooting a still image or a video. According to an embodiment of the present disclosure, the camera module 1791 may include at least one image sensor (e.g., a front sensor or a rear sensor), a lens, an image signal processor (ISP), or a flash (e.g., an LED or a xenon lamp).

The power management module 1795 may manage power of the electronic device 1701. According to an embodiment of the present disclosure, the power management module 1795 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1796 and a voltage, current or temperature thereof while the battery is charged. The battery 1796 may include, for example, a rechargeable battery and/or a solar battery.

The indicator 1797 may display a specific state of the electronic device 1701 or a part thereof (e.g., the processor 1710), such as a booting state, a message state, a charging state, or the like. The motor 1798 may convert an electrical signal into a mechanical vibration, and may generate a vibration or haptic effect. Although not illustrated, a processing device (e.g., a GPU) for supporting a mobile TV may be included in the electronic device 1701. The processing device for supporting a mobile TV may process media data according to the standards of digital multimedia broadcasting (DMB), digital video broadcasting (DVB), Media-FLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

According to various embodiments, an electronic device includes a display, a wireless communication circuit, a processor, and a memory, wherein the memory stores an application program, and the application program includes a user interface configured to manage a plurality of Internet-of-Things (IoT) devices, wherein the memory stores instructions that cause the processor to establish wireless communication with one or more IoT devices by using the wireless communication circuit, output the user interface including the one or more IoT devices through the display, receive a user input for selecting a group from the one or more IoT devices, transmit first information including user account data to a first external server by using the wireless communication circuit, and transmit second information to another electronic device by using the wireless communication circuit, wherein the first information includes information about the group and the user account related to the electronic device, and wherein the second information is information that causes the other electronic device to communicate with the first external server to connect to and control one or more IoT devices included in the group.

According to various embodiments, the instructions cause the processor to transmit the second information by using account information or a telephone number that is associated with the other electronic device.

According to various embodiments, the first information further includes account information or a telephone number that is associated with the other electronic device.

According to various embodiments, the instructions cause the processor to transmit the second information through a short message service (SMS).

According to various embodiments, the instructions cause the processor to manage the plurality of IoT devices by dividing the plurality of IoT devices into a plurality of groups. The instructions cause the processor to divide the plurality of IoT devices into the plurality of groups, based on places where the plurality of IoT devices are located.

According to various embodiments, an electronic device includes a display, a wireless communication circuit, a processor, and a memory, wherein the memory stores instructions that cause the processor to receive a push message through a first application for managing one or more Internet-of-Things (IoT) devices from a first external server, or receive an SMS message related to the first application from a second external server, and when the first application is executed, receive, from the first external server, setting information for controlling the one or more IoT devices by another electronic device.

According to various embodiments, the instructions cause the processor to receive the setting information for controlling the one or more IoT devices included in a specified place.

According to various embodiments, the instructions cause the processor to determine whether the first application is installed, and install the first application through a URL included in the SMS message when it is determined that the first application is not installed.

According to various embodiments, the instructions cause the processor to transmit a user account applied to the first application to the first external server when the SMS message is received and the first application is executed.

According to various embodiments, the instructions cause the processor to control at least some of the one or more IoT devices, based on the setting information received from the first external server.

According to various embodiments, the one or more IoT devices are configured to be controllable by the other electronic device.

According to various embodiments, the instructions cause the processor to have management authority equal to or less than authority of the other electronic device over the one or more IoT devices.

According to various embodiments, the instructions cause the processor to request authentication of identification information of the other electronic device from a third external server through the wireless communication circuit, and receive an authentication result from the third external server.

According to various embodiments, the identification information is a telephone number of the other electronic device.

According to various embodiments, a server device includes a memory, a communication circuit, and a processor, wherein the memory stores instructions that cause the processor to receive, from a first electronic device registered by first user account information, at least one of second user account information and identification information of a second electronic device, the first user account information, and setting information for controlling a plurality of Internet-of-Things (IoT) devices, create a database based on the second user account information or the identification information, receive, from the second electronic device, the second user account information or the identification information of the second electronic device, and transmit at least a portion of the setting information to the second electronic device when the information received from the second electronic device matches the information stored in the database.

According to various embodiments, an electronic device includes a display, a wireless communication circuit, a processor, and a memory, wherein the memory stores an application program, and the application program includes a user interface configured to manage a plurality of Internet-of-Things (IoT) devices, and wherein the memory stores instructions that cause the processor to establish wireless communication with one or more IoT devices by using the wireless communication circuit, output the user interface including the one or more IoT devices through the display, receive a user input for selecting a group from the one or more IoT devices, share a security code created in the electronic device or a first external server with another electronic device, and transmit first information including user account data to the first external server by using the wireless communication circuit.

According to various embodiments, the security code is a PIN code or a QR code.

According to various embodiments, the instructions cause the processor to share the security code with the other electronic device through short-range communication.

According to various embodiments, the instructions cause the processor to when the security code is created in the first external server, add a separate dummy code to the created security code and share the security code having the dummy code added thereto with the other electronic device.

According to various embodiments, an electronic device includes a display, a communication circuit, a memory, and a processor, wherein the processor establishes wireless communication with one or more Internet-of-Things (IoT) devices by using the communication circuit, transmits setting information of the one or more IoT devices to an external server by using the communication circuit, and transmits a request signal including first user account information and second user account information to the external server, wherein the request signal is a signal for transmitting at least a portion of the setting information to another device, wherein the first user account information is information about a first user registered in the electronic device, and wherein the second user account information is information about a second user registered in the other device.

According to various embodiments, an Internet-of-Things (IoT) device management method performed in an electronic device. The method includes establishing wireless communication with one or more IoT devices by using a communication circuit, outputting a user interface including the one or more IoT devices through a display, receiving a user input for selecting a group from the one or more IoT devices, transmitting first information including user account data to a first external server by using the communication circuit, wherein the first information includes information about the group and the user account related to the electronic device, and transmitting second information to another electronic device by using the communication circuit, wherein the second information includes information that causes the other electronic device to communicate with the first external server to connect to and control one or more IoT devices included in the group.

Figure 18:
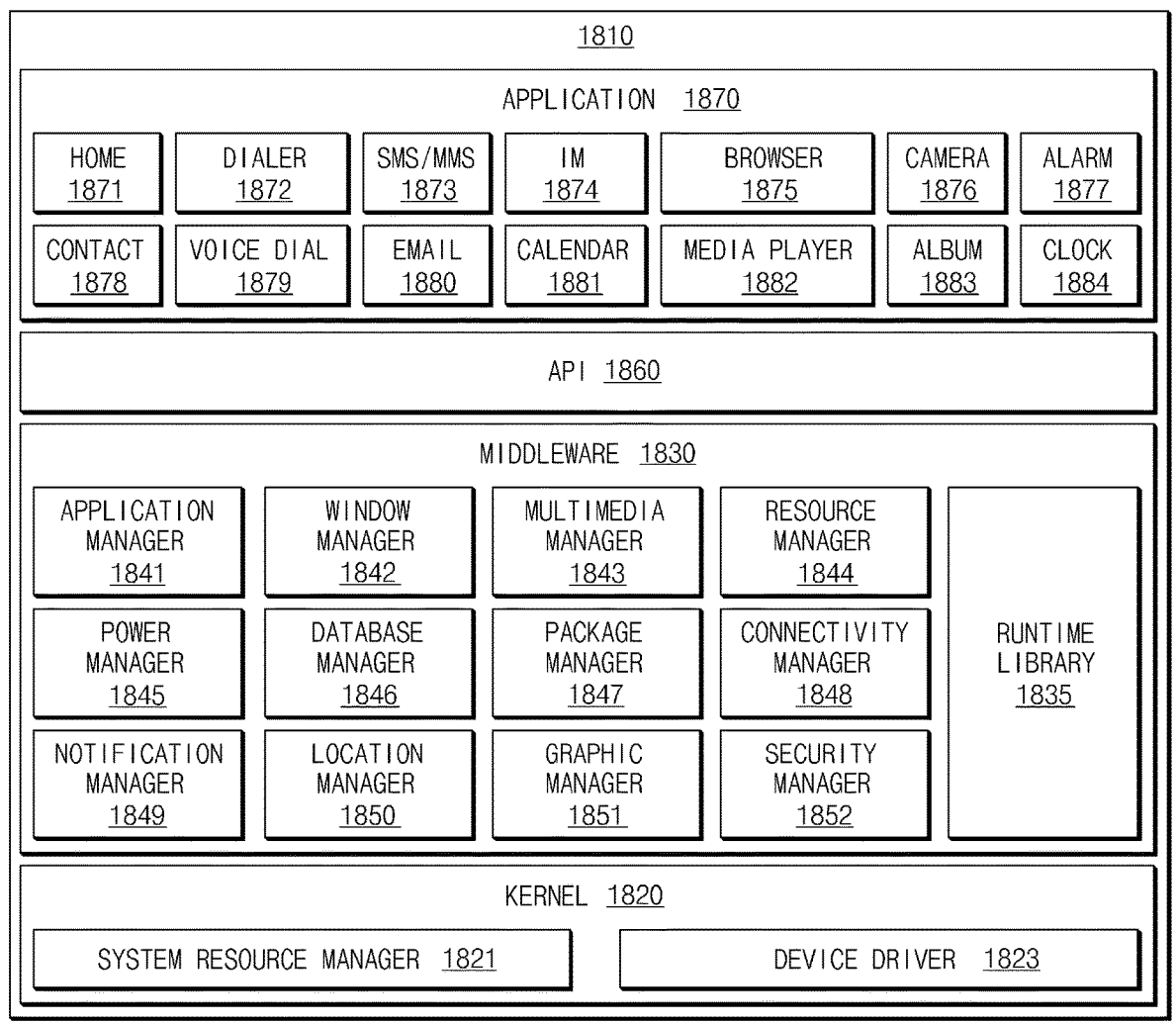
FIG. 18 is a block diagram of a program module according to various embodiments.

FIG. 18 is a block diagram illustrating a program module according to an embodiment of the present disclosure.

Referring to FIG. 18, a program module 1810 may include an operating system (OS) for controlling a resource related to an electronic device (e.g., the host device 110) and/or various applications (e.g., the application program 147) running on the OS. The operating system may be, for example, Android, iOS, Windows, Symbian, Tizen, or the like.

The program module 1810 may include a kernel 1820, a middleware 1830, an API 1860, and/or an application 1870. At least a part of the program module 1810 may be preloaded on an electronic device or may be downloaded from an external electronic device.

The kernel 1820 may include, for example, a system resource manager 1821 or a device driver 1823. The system resource manager 1821 may perform control, allocation, or retrieval of a system resource. According to an embodiment of the present disclosure, the system resource manager 1821 may include a process management unit, a memory management unit, a file system management unit, or the like. The device driver 1823 may include, for example, a display driver, a camera driver, a Bluetooth driver, a shared memory driver, a USB driver, a keypad driver, a Wi-Fi driver, an audio driver, or an inter-process communication (IPC) driver.

The middleware 1830, for example, may provide a function that the applications 1870 utilize in common, or may provide various functions to the applications 1870 through the API 1860 so that the applications 1870 may efficiently use limited system resources in the electronic device. According to an embodiment of the present disclosure, the middleware 1830 may include at least one of a runtime library 1835, an application manager 1841, a window manager 1842, a multimedia manager 1843, a resource manager 1844, a power manager 1845, a database manager 1846, a package manager 1847, a connectivity manager 1848, a notification manager 1849, a location manager 1850, a graphic manager 1851, and a security manager 1852.

The runtime library 1835 may include, for example, a library module that a complier uses to add a new function through a programming language while the application 1870 is running. The runtime library 1835 may perform a function for input/output management, memory management, or an arithmetic function.

The application manager 1841 may mange, for example, a life cycle of at least one of the applications 1870. The window manager 1842 may manage a GUI resource used in a screen. The multimedia manager 1843 may recognize a format utilized for playing various media files and may encode or decode a media file using a codec matched to the format. The resource manager 1844 may manage a resource such as a source code, a memory, or a storage space of at least one of the applications 1870.

The power manager 1845, for example, may operate together with a basic input/output system (BIOS) to manage a battery or power and may provide power information utilized for operating the electronic device. The database manager 1846 may generate, search, or utilize a database to be used in at least one of the applications 1870. The package manager 1847 may manage installation or update of an application distributed in a package file format.

The connectivity manger 1848 may manage wireless connection of Wi-Fi, Bluetooth, or the like. The notification manager 1849 may display or notify an event such as message arrival, appointments, and proximity alerts in such a manner as not to disturb a user. The location manager 1850 may manage location information of the electronic device. The graphic manager 1851 may manage a graphic effect to be provided to a user or a user interface related thereto. The security manager 1852 may provide various security functions utilized for system security or user authentication. According to an embodiment of the present disclosure, in the case in which an electronic device (e.g., the host device 110) includes a phone function, the middleware 1830 may further include a telephony manager for managing a voice or video call function of the electronic device.

The middleware 1830 may include a middleware module for forming a combination of various functions of the above-mentioned elements. The middleware 1830 may provide a module specialized for each type of an operating system to provide differentiated functions. Furthermore, the middleware 1830 may delete a part of existing elements or may add new elements dynamically.

The API 1860 which is, for example, a set of API programming functions may be provided in different configurations according to an operating system. For example, in the case of Android or iOS, one API set may be provided for each platform, and, in the case of Tizen, at least two API sets may be provided for each platform.

The application 1870, for example, may include at least one application capable of performing functions such as a home 1871, a dialer 1872, an SMS/MMS 1873, an instant message (IM) 1874, a browser 1875, a camera 1876, an alarm 1877, a contact 1878, a voice dial 1879, an e-mail 1880, a calendar 1881, a media player 1882, an album 1883, a clock 1884, health care (e.g., measure an exercise amount or blood sugar), or environmental information provision (e.g., provide air pressure, humidity, or temperature information).

According to an embodiment of the present disclosure, the application 1870 may include an information exchange application for supporting information exchange between the electronic device (e.g., the host device 110) and an external electronic device. The information exchange application may include, for example, a notification relay application for relaying specific information to the external electronic device or a device management application for managing the external electronic device.

For example, the notification relay application may have a function for relaying, to an external electronic device, notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device communicating with the electronic device, an application running in the external electronic device, or a service (e.g., a call service, a message service, or the like) provided from the external electronic device.

According to an embodiment of the present disclosure, the application 1870 may include a specified application (e.g., a healthcare application of a mobile medical device) according to an attribute of the external electronic device. The application 1870 may include an application received from an external electronic device. The application 1870 may include a preloaded application or a third-party application downloadable from a server. The names of the elements of the program module 1810 illustrated may vary with the type of an operating system.

According to various embodiments of the present disclosure, at least a part of the program module 1810 may be implemented with software, firmware, hardware, or a combination thereof. At least a part of the program module 1810, for example, may be implemented (e.g., executed) by a processor (e.g., the processor 1710). At least a part of the program module 1810 may include, for example, a module, a program, a routine, sets of instructions, or a process for performing at least one function.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a display;
a wireless communication circuit;
a processor; and
a memory that stores an application program for managing a plurality of Internet-of-Things (IoT) devices, the application program including instructions executable by the processor to:
establish wireless communication with one or more IoT devices by using the wireless communication circuit;
display a user interface for managing the one or more IoT devices through the display, wherein a first user interface includes a list for a first user input selecting IoT devices from among the one or more IoT devices to form a group, and wherein a second user interface includes a field into which account information associated with a user of another electronic device is entered, and an object for sending a Short Message Service (SMS) message;
when the account information is entered into the field and confirmed on the second user interface, transmit first information including user account data of the electronic device, group information indicating the selected IoT devices forming the group and the account information or a telephone number of the another electronic device to a first external server using the wireless communication circuits;
wherein the first external server transmits a push message to the another electronic device causing the another electronic device to communicatively connected with the first external server and control the selected IoT devices; and
when the object for sending the SMS message is selected in the second user interface, and
transmit second information including URL information for downloading the application program to the another electronic device using the SMS message by the wireless communication circuit,
wherein the second information causes the another electronic device to communicatively connect with the first external server and control the selected IoT devices.

2. The electronic device of claim 1, wherein the second information is transmitted using at least one of account information associated with the another electronic device and the telephone number of the another electronic device.

3. The electronic device of claim 1, wherein the plurality of IoT devices are divided into a plurality of groups.

4. The electronic device of claim 3, wherein the instructions are executable by the processor to divide the plurality of IoT devices into the plurality of groups, based on locations where the plurality of IoT devices are located.

5. The electronic device of claim 1, wherein the instructions are executable by the processor to:
share at least one of a security code generated in the electronic device and the first external server with another electronic device.

6. The electronic device of claim 5, wherein the security code is a personal identification number (PIN) code or a quick response (QR) code.

7. The electronic device of claim 5, wherein the instructions are executable by the processor to:
transmit the security code to the another electronic device using short-range communication.

8. The electronic device of claim 5, wherein the instructions are executable by the processor to:
when the security code is generated in the first external server, add a dummy code to the generated security code; and
transmit the generated security code to which the dummy code is added to the another electronic device.

9. The electronic device of claim 1, wherein the instructions are executable by the processor to:
receive a request from the another electronic device to control the one or more IoT devices; and
responsive to receiving an input confirming the request, transmitting the first information.

10. The electronic device of claim 1, wherein the instructions are executable by the processor to:
after sending the SMS message, transmit third information including the user account data, the group information and the telephone number of the another electronic device to the first external server using the wireless communication circuit in the background.

* * * * *